United States Patent
Otose et al.

(10) Patent No.: US 7,612,856 B2
(45) Date of Patent: Nov. 3, 2009

(54) DISPLAY DEVICE

(75) Inventors: Tomohiko Otose, Kanagawa (JP); Koji Shigemura, Tokyo (JP)

(73) Assignees: NEC LCD Technologies, Ltd., Kanagawa (JP); NEC Corporation, Tokyo (JP)

( * ) Notice: Subject to any disclaimer, the term of this patent is extended or adjusted under 35 U.S.C. 154(b) by 387 days.

(21) Appl. No.: 11/390,863

(22) Filed: Mar. 28, 2006

(65) Prior Publication Data

US 2006/0215102 A1 Sep. 28, 2006

(30) Foreign Application Priority Data

Mar. 28, 2005 (JP) ............... 2005-093195

(51) Int. Cl.
*G02F 1/1339* (2006.01)
*G02F 1/1345* (2006.01)

(52) U.S. Cl. .................. 349/153; 349/149; 349/151

(58) Field of Classification Search ............ None
See application file for complete search history.

(56) References Cited

U.S. PATENT DOCUMENTS 5,648,685 A * 7/1997 Misawa et al. ............... 257/775

2002/0171798 A1 * 11/2002 Tanaka et al. ............... 349/153
2004/0051836 A1 * 3/2004 Jung et al. ............... 349/149

FOREIGN PATENT DOCUMENTS

| JP | 2836642 | 12/1998 |
|---|---|---|
| JP | 2893433 | 5/1999 |
| JP | 2001-183696 | 7/2001 |
| JP | 3208909 | 9/2001 |
| JP | 3410754 | 5/2003 |
| JP | 2003-177428 | 6/2003 |
| JP | 3413230 | 6/2003 |
| JP | 2003-216126 | 7/2003 |
| JP | 2003-255380 | 9/2003 |
| JP | 2003-344873 | 12/2003 |
| JP | 2004-046054 | 2/2004 |

* cited by examiner

*Primary Examiner*—Tina M Wong
(74) *Attorney, Agent, or Firm*—Dickstein Shapiro LLP

(57) ABSTRACT

A display device includes: a pair of substrates disposed opposite each other; a conductive seal for sealing the gap of the outer peripheral part between the pair of substrates; an electric optical element disposed in an area defined by the substrates and the seal; a display area, formed on one substrate, having a plurality of pixels for controlling the electric optical element; and a driver circuit for controlling the pixels. The driver circuit is so configured that a circuit element affected by stray capacitance formed between the conductive seal and the driver circuit is disposed apart from the conductive seal.

7 Claims, 26 Drawing Sheets

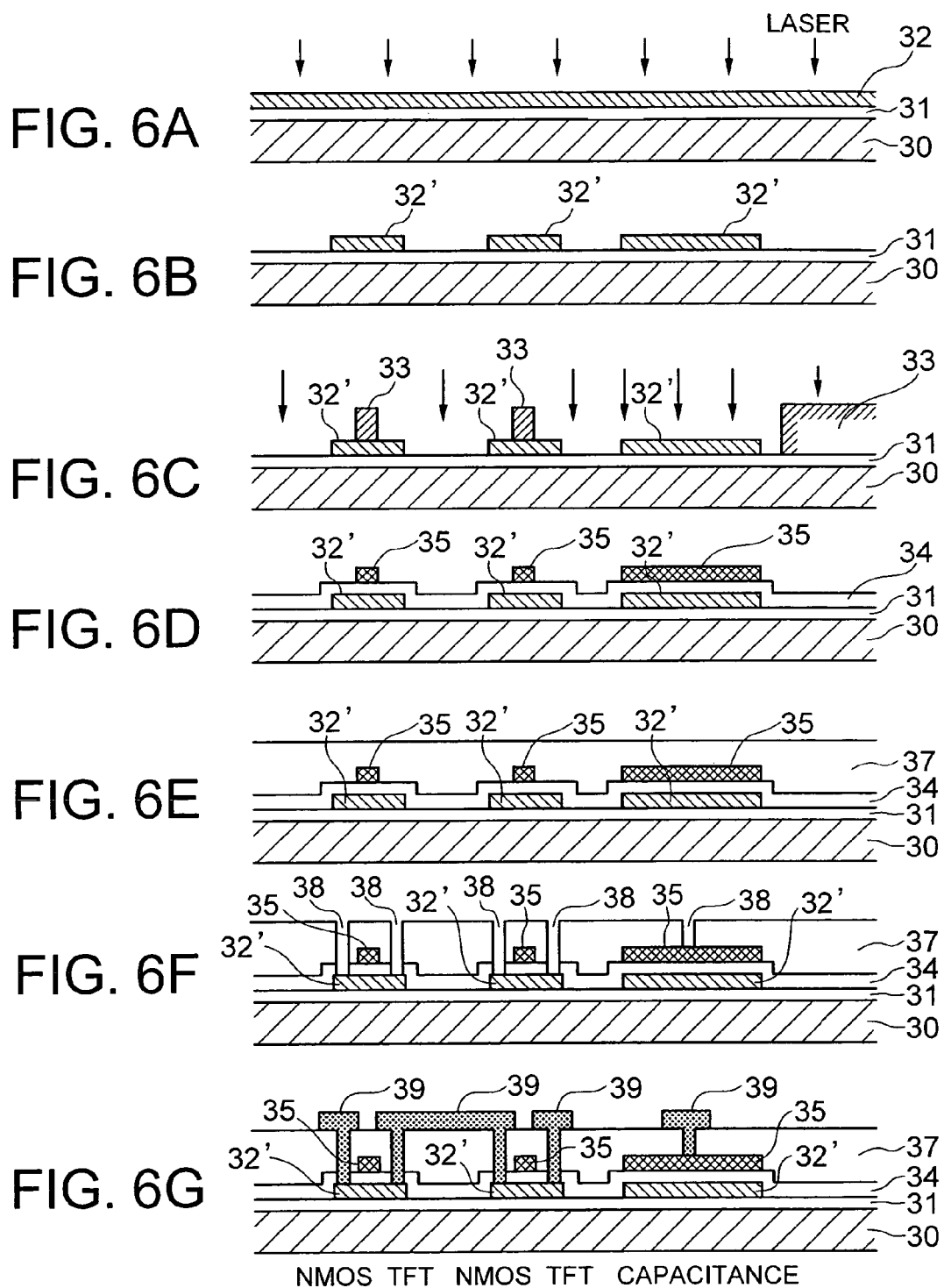

PMOS TFT  PMOS TFT  CAPACITANCE

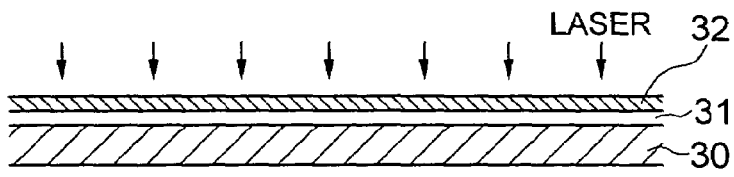
FIG. 13A
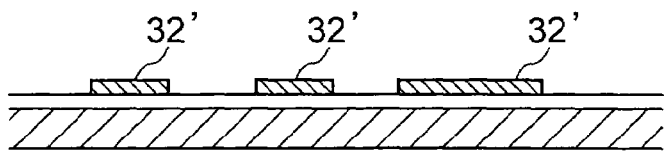
FIG. 13B
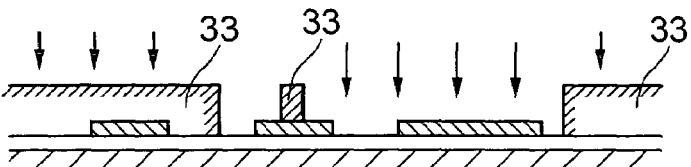
FIG. 13C
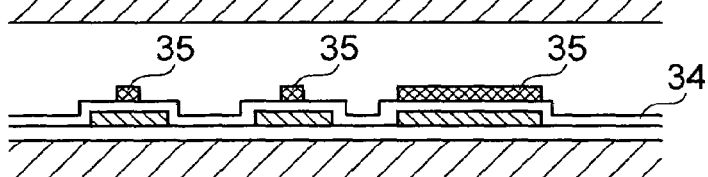
FIG. 13D
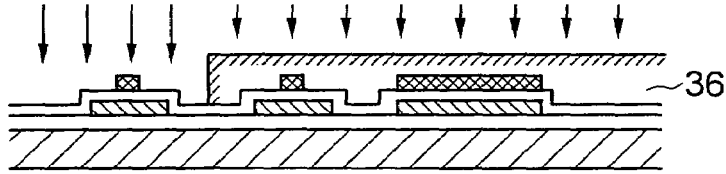
FIG. 13E
FIG. 13F
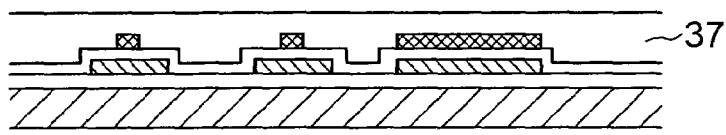
FIG. 13G
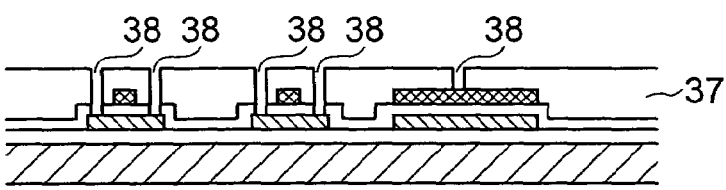
FIG. 13H
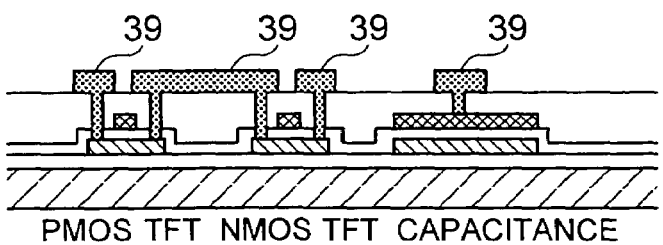
PMOS TFT  NMOS TFT  CAPACITANCE

DISPLAY DEVICE

BACKGROUND OF THE INVENTION

1. Field of the Invention

The present invention relates to a display device such as an active matrix type one.

2. Description of Related Art

A conventional driving circuit integrated-type active matrix liquid crystal display will be explained.

As a polysilicon TFT (thin film transistor) formed on an insulating substrate, an expensive quartz substrate was required for a high temperature process, so it was applied to a small display panel with high-value added. Then, a technique for forming a precursor film by low pressure (LP) CVD (chemical vapor deposition), plasma (P) CVD, or sputtering, which is annealed with a laser to thereby polycrystallize, that is, a technique for forming a polysilicon TFT at a low temperature capable of using a glass substrate or the like has been developed. At the same time, an oxide film forming technique, a fine processing technique, a circuit design technique and the like have been developed. Consequently, there have been produced polysilicon TFT display panels for mobile phones, portable information devices, and note PCs in which surrounding circuits of a display panel are integrated on the same substrate.

As shown in FIG. 19A, a conventional liquid crystal display device (see publication of Japanese Patent Laid-open No. 2004-46054, pp. 31 to 32 and FIGS. 37 and 38 (Patent Document 1)) is so configured as to include: an active matrix display area 110 on which wirings are arranged in a matrix and pixels are aligned in M lines and N rows; a scan circuit (scan line (gate line) driving circuit) 109 in a line direction; a scan circuit (data line driving circuit) 3504 in a row direction; an analog switch 3505; and a level shifter 3503, which are formed integrally with a polysilicon TFT on a display device substrate 101. A controller 113, a memory 111, a digital/analog conversion circuit (DAC circuit) 3502, a scan circuit/data resistor 3501, for example, are integrated circuit chips (IC chips) formed on a monocrystalline silicon wafer, which are mounted outside the area of the display device substrate 101. The analog switch 3505 has the number of outputs same as the number N of data lines in the row direction of the active matrix display area 110.

Further, some conventional driving circuit integrated-type liquid crystal display devices consisting of polysilicon TFT, are so formed that more complicated circuits such as DAC circuits are integrated. A liquid crystal display device of the DAC circuit integrated type includes, as shown in FIG. 19B, an active matrix display area 110 on which wirings are arranged in a matrix and pixels are aligned in M lines and N rows, a scan circuit 109 in a line direction, and a scan circuit 3506 in a row direction, same as those of the device shown in FIG. 19A in which DAC circuits are not integrated, and further includes circuits such as a data register 3507, a latch circuit 105, a DAC circuit 106, a selector circuit 107, a level shifter/timing buffer 108 are formed integrally on the display device substrate 101.

In a liquid crystal display device shown in FIG. 19B, a controller IC mounted outside the area of the display device substrate 101 can consist solely of low voltage circuits and elements such as the memory 111, the output buffer 112, the controller 13, without a DAC circuit using high voltage. As a result, the IC can be produced without using a process for high voltage which is required for generating voltage signals for writing into liquid crystal. Therefore, the price can be suppressed lower than that of an IC incorporating the DAC.

The liquid crystal display device shown in FIG. 19B has such features as thin and light, so the liquid crystal display device shown in FIG. 19B is mounted on a portable type information processor by using the features.

The liquid crystal display devices shown in FIGS. 19A and 19B are examples of a typical CMOS (complementary metal-oxide semiconductor) configuration. With the CMOS configuration, a shift resistor circuit constituting scan circuits such as a scan circuit 109 in a line direction or a scan circuit 3506 in a low direction can be realized with an inverter circuit and a statistic circuit using a clocked inverter circuit.

Not only a TFT circuit of the CMOS configuration, there has been also proposed a driving circuit integrated-type display device consisting solely of NMOS or PMOS, that is, a so-called single channel TFT. A single channel TFT circuit can be produced through saved processes comparing with a TFT circuit of CMOS configuration, so the cost is expected to be low. A shift register consisting of the single-channel TFT described above is disclosed in publication of Japanese Patent No. 2836642, p. 4, FIGS. 1 to 4 (Patent Document 2).

As shown in FIG. 20A, the liquid crystal display device includes a plurality of stages 11, which are substantially same, in the shift register 10. Each of the stage 11 has an input terminal 12 and an output terminal 13. The stages 11 are cascade-connected. That is, the output terminal 13 of each stage 11 is connected with the input terminal 12 of the next stage, and each stage 11 has two clock input terminals 14 and 15. A clock generator 22 generates three clock signals C1, C2 and C3 in which phases thereof are shifted to each other. Pairs of clock signals, each pair of which has a different combination, are inputted into clock terminals 14 and 15 of each stage 11, and each stage 11 receives a pair of clock signals different from pairs of clock signals received by the stages of the both adjacent sides. Relationships between the clock pulses C1, C2 and C3 and four output pulses are shown in FIG. 21A.

Each stage shown in FIG. 20A is configured by combining a plurality of TFT 16 to 21, as shown in FIG. 20B.

In the stages 11 shown in FIGS. 20A and 20B, the level of a node P2 at a time T0 is high as shown in FIG. 21B, and the TFT 17 is ON, and an output terminal 13 of the stage 11 is biased at a low voltage VSS.

When an input pulse is inputted into the input terminal 12 of the stage 11 and the clock pulse C3 is supplied to a clock terminal 15, TFT 18, 20 and 21 at the stage 11 are turned on simultaneously. Therefore, the voltage value of the node P1 of the stage 11 starts to be positive toward a voltage value equal to VDD-Vt. Here, Vt is a threshold voltage of the TFT 18. Thereby, the TFT 16 of the stage 11 is biased. At the same time, since the TFT 21 at the stage 11 is in an ON state, the node P2 becomes a Lo level.

When the node P2 at the stage 11 becomes a Lo level, the TFT 17 of the stage 11 is in an OFF state but the clock pulse C1 of the stage 11 is in a Lo level, so the output terminal 13 of the stage 11 remains at the Lo level. When the clock pulse C1 of a Hi level is inputted into the clock terminal 14 of the stage 11, the TFT 16 of the stage 11 has been pre-charged to a Hi level, and further, the node P1 of the stage 11 is pressurized due to a fixed stray capacitance of gate/drain. Thereby, the output terminal 13 of the stage 11 can follow the clock signal C1. Therefore, selection lines (gate lines) of the display device are charged to a desired voltage with the output pulses, and further, input pulse of Hi level is supplied to the subsequent stage.

Next, reverse driving of a counter electrode in a liquid crystal display device will be explained.

A display device substrate 101 shown in FIG. 19 is combined with a counter substrate, and an electric optical element is interposed between the display device substrate 101 and a counter substrate to thereby constitute the display area 110 of the liquid crystal display device.

As shown in FIG. 22A, pixels formed on the display area 110 includes a TFT 1800 for performing switching action, a data line 1011, a gate line 1010, a storage stray capacitance 1802, a common line 1801, an electric optical element (liquid crystal) 1004, and a counter electrode 1002. A switch TFT 1800 shown in FIG. 22A consists of a NMOS TFT.

As shown in FIG. 22A, voltage applied to the gate line 1010 of the display area 110, that is, voltage applied to respective gate lines G1, G2, ... Gn−1 and Gn becomes Hi level sequentially with a time lag. When the voltage of the gate line 1010 becomes Hi voltage, the switch TFT 1800 is in an ON state, and the data line 1011 and the node A of the storage stray capacitance 1802 are in a conductive state, whereby the voltage of the data line 1011 is applied to the node A. That is, data is written. At this time, potential differences Vcom between the common line 1801 and the counter electrode 1002 are equal in all gate lines, as shown in FIG. 22B. Here, a voltage difference between the node A and the counter electrode 1002 is a voltage applied to the liquid crystal 1004. Since the transmittance of the liquid crystal 1004 is different depending on the voltage, the liquid crystal 1004 serves as a display element by controlling the voltage. Further, as shown in FIG. 22B, the level of the potential difference Vcom reverses to Hi level or to Lo level by each neighboring gate line 1010, and further reverses by frame. When the level of the voltage difference is caused to be reversed as described above, there is a merit that voltage amplitude of the data line 1011 is smaller comparing with the case of driving the level of the voltage difference Vcom constant.

Although the configuration of a TFT substrate has been described in the explanation above, a driving circuit is required for driving pixels of the TFT substrate. Therefore, in order to incorporate a driving circuit into the TFT substrate without interfering the function of the TFT substrate, positioning relationship with the TFT substrate becomes a problem.

In a liquid crystal display device, a TFT substrate and a counter substrate are arranged in parallel facing each other, and liquid crystal is filled between the both substrates. Therefore, in order to fill in the liquid crystal between the both substrates, a gap between the TFT substrate and the counter substrate in the surrounding part thereof should be sealed.

FIG. 23A shows an example of positional relationship between the TFT substrate and the driving circuit (see publication of Japanese Patent Application Laid-open No. 3208909, p. 4, FIG. 3(b) (Patent Document 3)). In FIG. 23A, the reference numeral 301 indicates an element substrate (TFT substrate), 302 indicates a counter substrate, 303 indicates a seal area (seal), 304 indicates a driver circuit (driving circuit), 311 indicates a counter electrode, 312 indicates an orientation film, 313 indicates a pixel driving transistor, 314 indicates a pixel electrode, 315 indicates a contact hole with a pixel electrode, 317 indicates a wiring, 319 indicates a transparent organic insulating film, and 321 indicates a gap agent.

In Patent Document 3, the driver circuit 304 is formed on the element substrate 301 at a position inside the seal area 3030 for sealing the gap between the element substrate 301 and the counter substrate 302.

FIG. 23B shows another example (publication of Japanese Patent No. 2893433, p. 3, FIG. 2 (Patent Document 4)). In FIG. 23B, the reference numerals 17 and 18 indicate glass substrates, 19 indicates a pixel electrode, 20 indicates a thin film transistor, 21 indicates a gate line driving circuit (driver circuit), 22 indicates a drain line driving circuit (driver circuit), 23 and 25 indicate orientation films, 26 indicates a seal member, 28 indicates liquid crystal, and G1 indicates a gate line.

In FIG. 23B, the gate line driving circuit 21 is formed near the seal member 26, and a part of which is covered with the seal member 26, and the remaining part is formed so as to be protruded inward from the seal member 26, that is, to the liquid crystal 28 side.

FIG. 23C shows another example (publication of Japanese Patent No. 3413230, p. 4, FIG. 2(b) (Patent Document 5)). In FIG. 23C, the reference numeral 201 indicates an element substrate, 203 indicates a driver circuit, 206 indicates a seal, 207 indicates a counter substrate, 209 indicates liquid crystal, and 210 indicates a pixel electrode.

In FIG. 23C, the driver circuit 203 is formed within the width area of the seal 206.

FIG. 23D shows another example (publication of Japanese Patent No. 3410754, p. 3, FIG. 2, (Patent Document 6)). In FIG. 23D, the reference numeral 101 indicates a glass substrate (TFT substrate), 102 indicates a pixel TFT, 103 indicates a driver, 106 indicates a pixel electrode, 107 indicates a counter substrate, 108 indicates an adhesive, and 109 indicates a counter electrode.

In FIG. 23D, the adhesive 108 corresponds to a seal for sealing the gap between the glass substrate 101 and the counter substrate 107, and the driver 102 is formed outside the adhesive 108.

Next, the structure of the counter electrode of the counter substrate and the contact structure will be explained by using FIGS. 24A and 24B.

As shown in FIGS. 24A and 24B, an electric optical device is so configured that a liquid crystal layer 50 is interposed between the TFT array substrate 10 and the counter substrate 20, and the gap of the surrounding part between the TFT array substrate 10 and the counter substrate 20 is sealed with the seal 52 provided in the seal area positioned around the pixel display area 10. The seal 52 is made of ultraviolet curing resin or thermal curing resin for adhering the both substrates, and the seal is applied onto the TFT array substrate 10 in the manufacturing process and then cured by ultraviolet irradiation or heating. In the seal 52, gap members (spacers) such as glass fibers or glass beads for setting the distance between the both substrates (gap between substrates) to a predetermined value may be scattered, if the electric optical device is a small one performing enlarging display such as one for projector. Alternatively, if the electric optical device is a large one performing same magnification display such as a liquid crystal display and a liquid crystal television, such a gap member may be included in the liquid crystal layer 50.

In parallel with the inside of the seal area where the seal 52 is arranged, a first shielding film 53 defining the frame area of the image display area 10 is provided on the counter substrate 20. In the surrounding area outside the seal area where the seal 52 is disposed, the data line driving circuit 101 and the outside circuit connection terminal 102 are provided along one edge of the TFT array substrate, and the scan line driving circuit 104 is provided along two edges adjacent the one edge. Further, along the remaining one edge of the TFT array substrate 10, there are provided a plurality of wirings 105 for connecting two scan line driving circuits 104 provided on the both sides of the image display area, respectively. Further, in at least one of corner parts of the counter substrate 20, a vertically conductive member 106 for providing electric conductivity between the TFT array substrate 10 and the counter substrate 20 is provided.

In FIG. 24B, on the TFT array substrate 10, an orientation film made of a polyimide material is formed on the pixel electrode 9a after TFT for pixel switching and wirings such as scan lines, data lines and stray capacitance lines are formed. On the counter substrate 20, on the other hand, an orientation film made of a polyimide material is formed on the uppermost layer part (layer positioned the lowermost in FIG. 24B) on which a color filter, a first shielding film 53 and the like are formed besides the counter electrode 21. Each of a pair of orientation films is formed such that a polyimide material is applied in the manufacturing process, and after burnt, orientation processing is performed so as to orient the liquid crystal in the liquid crystal layer 50 in a predetermined direction and to cause the liquid crystal to have a predetermined pre-tilt angle. Further, the liquid crystal layer 50 consists of liquid crystal in which one or several types of nematic liquid crystal are mixed for example, and takes a predetermined orientation state between a pair of orientation films.

In this publicly known example, in a rectangle area shown by the bold line encircling most of the lower edge of the seal 52 in a plan view, the shield layer 8 consisting of a conductor is formed between the seal 52 and the TFT substrate array 10, as shown in FIG. 24B. In particular, the shield layer 80 is interposed between the electric signal lines and the drawing lines thereof and the sampling circuit driving signal lines formed on the TFT array substrate 10, and the counter electrode 21 formed on the counter electrode 20 formed on the counter substrate 20, so as to electrically shield the latter from the former.

Hereinafter, a problem when a dynamic circuit formed of a single-channel TFT as shown in FIG. 20 described above is applied to a display device using an electric optical element will be explained. Generally, in the display device, two substrates are made opposite each other as shown in FIG. 23. That is, a counter substrate exists so as to face a substrate on which the dynamic circuit is formed. The configuration between the substrate on which the dynamic circuit is formed and the counter substrate differs depending on the position where the dynamic circuit is formed.

For example, on the upper face of the driver circuit 304 in FIG. 23A, a liquid crystal member, a gap member 321 and the like exist, and further a counter electrode 311 exist on a face above them. That is, when paying attention to a node at which the driver circuit 304 exists, liquid crystal or liquid crystal and a gap member 321 are interposed between the driver circuit 304 and the counter electrode 311, and a sandwich structure of the driver circuit 304 and the counter electrode forms stray capacitance.

Further, in the gate line driving circuit 21 in FIG. 23B, a part thereof is covered with a seal 26 and a part of the remaining is covered with liquid crystal 28, and common electrodes 24 exist opposite each other. Although it differs depending on whether the gate line driving circuit 21 exists, a sandwich structure of the gate line driving circuit 21 and the common electrode 24 forms stray capacitance.

Further, the driver circuit 203 in FIG. 23C is covered with a seal 206, and the driver circuit 203 and the common electrode 218 exist opposite each other.

The seal 206 shown in FIG. 23C has conductivity, and the seal 206 communicates with an electrode on the counter substrate side not shown. As shown in FIG. 25, the seal 206 communicates with a counter contact 1200 which is an electrode on the TFT substrate side. As obvious from FIG. 25, the counter contact 1200 and the node positioned immediately below thereof having the driver circuit 203 serve as electrodes respectively and form stray capacitance having an interlayer film 207 therebetween.

As described above, the counter electrode 311 shown in FIG. 23A, the common electrode 24 shown in FIG. 23B and the conductive seal 206 shown in FIG. 23C, and the driver circuit 304 shown in FIG. 23A, the gate line driving circuit 21 shown in FIG. 23B and the node of the driver circuit 203 shown in FIG. 23 form stray capacitance by interposing electric optical element and a seal and the like which are dielectrics.

The stray capacitance will be explained based on FIG. 26A. As shown in FIG. 26A, the node N where the driving circuit exists and the counter electrode 1001 form an electrode of the stray capacitance. Liquid crystal, a seal and the like existing between the electrodes serve as dielectrics of the stray capacitance. The distance between the electrodes and dielectric ratio of the dielectrics are parameters of the stray capacitance C shown in FIG. 26A. In FIG. 26A, assuming that the potential of the node N of the driving circuit is Vn, when the node N is in a floating state, Vn becomes one shown in the timing chart showing potential of Vcom and Vn due to the fluctuation of Vcom, as shown in FIG. 26B. That is, with respect to Vcom fluctuating with amplitude from VH to VL, the node N which is a floating node fluctuates from VH' to VL'.

A problem when the potential of the node in a floating state varies due to fluctuation of Vcom will be explained specifically in accordance with the publicly known example of Patent Document 2. Referring to FIGS. 20B and 21B, in a state where an input becomes the Lo level, the TFT 18 becomes an off-state. At this time, since the node P2 is in an off-state, the TFT 19 is also in an off-state. Therefore, the node P1 is in a floating state, so potential of the node P1 varies in the same way as Vn in FIG. 26B. Since the potential of the node P1 is a voltage applied to the gate of the TFT 16, when the potential of the node P1 is lowered than a design value, the current driving capacity of the TFT 16 is lowered. In contrast, when the potential of the node P1 rises from the design value, voltage more than required is applied to the TFT 16. In the former case, a period for reaching the Hi level of the output 1 increases so as to cause delay in the circuit operation, so operation margin decreases. In the latter case, reliability is lowered due to voltage and current stress of the TFT 16.

In particular, in Patent Document 5, the forming position of the stray capacitance is not a position where the counter substrate and the node of the TFT circuit face each other, but a position where the wiring used as a contact between the seal and the TFT substrate and the node of the TFT circuit face each other. Therefore, the stray capacitance value of the stray capacitance is very large. Therefore, since the fluctuation value becomes large necessarily, the problem becomes prominent.

Further, even in the case of using a driving circuit consisting of CMOS, in the clocked inverter circuit shown in FIG. 26C for example, there is a period in which the node N between the NMOS transistors N1 and N2 or the node P between the PMOS transistors P1 and P2 is in a floating state in operation. Therefore, as potential of the floating node varies according to the fluctuation of Vcom, there may be caused an operational error, or a decrease in circuit operational margin even operational error is not caused, or a decrease in reliability, same as the case of the dynamic circuit.

In FIG. 23D, in the configuration where the driver 103 is arranged outside the adhesive 108, the above-described problem may be reduced. However, there is caused another problem that the distance from an end of the adhesive 108 to an end of the glass substrate (frame) will become larger. If the frame size of the display area is large, the substrate area increases, which causes to increase the cost, and it is difficult to meet a recent demand of smaller display devices.

Further, in the configuration shown in FIGS. 24A and 24B, a problem of stray capacitance coupling is solved by using the shield layer 80. The resolution shown in FIGS. 24A and 24B is intended for a wiring unit, and is not related to the driving circuit of the liquid crystal display device. Further, by adding a process of producing the shield layer 80, the cost may be increased.

Therefore, if the conventional art described above is applied to a display device performing operation in which potential Vcom of a counter electrode varies temporally, (a) malfunction of driving circuit and a decrease in operational margin and reliability are caused, (b) an increase in the frame length, or (c) high cost may be caused.

SUMMARY OF THE INVENTION

It is therefore an object of the present invention to provide a driving circuit integrated-type active matrix display device capable of providing high operational margin, high reliability, narrow frame, small size and low cost.

In order to achieve the object, a display device according to the present invention includes: a pair of substrates disposed opposite each other; a conductive seal for sealing the gap of the outer peripheral part between the pair of substrates; an electric optical element disposed in an area defined by the substrates and the seal; a display area, formed on one substrate, having a plurality of pixels for controlling the electric optical element; and a driver circuit for controlling the pixels. The driver circuit is so configured that a circuit element affected by stray capacitance formed between the conductive seal and the driver circuit is disposed apart from the conductive seal.

It is desirable that the driver circuit be so configured that a circuit element which is not affected by the stray capacitance formed between the conductive seal and the driver circuit is disposed in an area of the conductive seal.

As described above, according to the present invention, a circuit element, in a driver circuit for controlling pixels in a display area, affected by stray capacitance formed between a conductive seal and a driver circuit is disposed apart from the conductive seal. Thereby, even if voltage fluctuation of counter electrode is caused, it is possible to prevent an influence placed by the stray capacitance on the driver circuit, whereby high operational margin and high reliability can be secured. Further, since it has such a configuration that only positional relationship of the circuit element to the conductive seal is changed, it is possible to achieve an active matrix display device having a configuration in which a driver circuit is integrated with a substrate at low cost.

Further, the driver circuit has a configuration in which a circuit element, not affected by stray capacitance formed between the conductive seal and the driver circuit, is disposed in the area of the conductive seal, it is possible to suppress a space which should be secured in the outer peripheral part of the substrates for forming the driver circuit as small as possible, whereby the width dimension of the frame provided to the substrate can be narrow as much as possible, so the size of the display device can be smaller.

BRIEF DESCRIPTION OF THE DRAWINGS

FIGS. 1A and 1B show a display device of an embodiment 1, in which FIG. 1A is a plan view and FIG. 1B is a partial sectional view;

FIGS. 4A and 4B are timing charts showing operation of the transfer circuit in the embodiment 1, in which FIG. 4A is a full view and FIG. 4B is a partially enlarged view;

FIGS. 5A and 5B are illustrations about a position on a TFT substrate of the transfer circuit in the embodiment 1, in which FIG. 5A shows a case where L is large, and FIG. 5B shows a case where L is small;

FIGS. 6A to 6G are illustrations showing a method of manufacturing the TFT substrate in the embodiment 1, in which steps progress in the order from FIG. 6A to FIG. 6G;

FIGS. 8A and 8B are timing charts showing operation of the transfer circuit in the embodiment 2, in which FIG. 8A is a full view and FIG. 8B is a partially enlarged view;

FIGS. 9A and 9B are illustrations about a position on a TFT substrate of the transfer circuit in the embodiment 2, in which FIG. 9A shows a case where L is large, and FIG. 9B shows a case where L is small;

FIGS. 11A to 11C are circuit diagrams showing an exemplary configuration of a transfer circuit of an embodiment 3, in which FIG. 11A shows an example including an inverter or the like, FIG. 11B is a first example including a TFT, and FIG. 11C is a second example including a TFT;

FIGS. 12A and 12B are circuit diagrams showing an exemplary configuration of an output circuit of the embodiment 3, in which FIG. 12A is an example including an inverter and FIG. 12B is an example including a TFT.

FIGS. 13A to 13H are illustrations showing a method of manufacturing the TFT substrate of the embodiment 3, in which steps progress in the order from FIG. 13A to FIG. 13H;

FIGS. 14A and 14B show a display device of an embodiment 4, in which FIG. 14A is a partial sectional view and FIG. 14B is a partial plan view;

FIGS. 15A and 15B show a display device of an embodiment 5, in which FIG. 15A is a plan view and FIG. 15B is a partial sectional view;

FIGS. 16A and 16B show a display device of an embodiment 6, in which FIG. 16A is a plan view and FIG. 16B is a partial sectional view;

FIGS. 17A and 17B show a display device of an embodiment 7, in which FIG. 17A is a plan view and FIG. 17B is a partial sectional view;

FIGS. 18A and 18B show a display device of an embodiment 8, in which FIG. 18A is a plan view and FIG. 18B is a partial sectional view;

FIGS. 19A and 19B are block diagrams, in which FIG. 19A shows the configuration of a display system of a conventional typical liquid crystal display device in which a driving circuit is integrated, and FIG. 19B shows the configuration of a display system of a conventional liquid crystal display device in which a DAC circuit is integrated;

FIGS. 21A and 12B are timing charts showing operation of the publicly known example (Patent Document 2);

FIGS. 23A to 23D are sectional views showing configurations of liquid crystal display devices of publicly known examples, in which FIG. 23A shows Patent Document 3, FIG. 23B shows Patent Document 4, FIG. 23C shows Patent Document 5 and FIG. 23D shows Patent Document 6;

FIGS. 24A and 24B show a display device of a publicly known example (Patent Document 7), in which FIG. 24A is a plan view and FIG. 24B is a sectional view;

FIGS. 26A to 26C show conventional art, in which FIG. 26A is a schematic diagram showing the relationship between a driving circuit and a counter electrode, FIG. 26B is a timing chart showing potential of Vcom and Vn, and FIG. 26C is a circuit diagram showing a clocked inverter circuit.

DESCRIPTION OF PREFERRED EMBODIMENTS

Hereinafter, embodiments of the present invention will be explained based on the drawings.

Embodiment 1

Figure 1A:
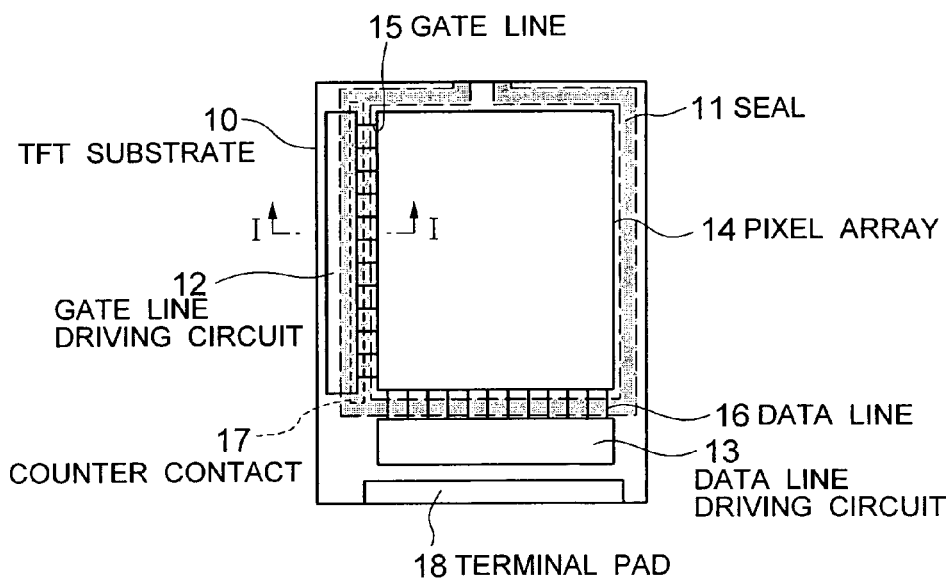
Figure 1B:
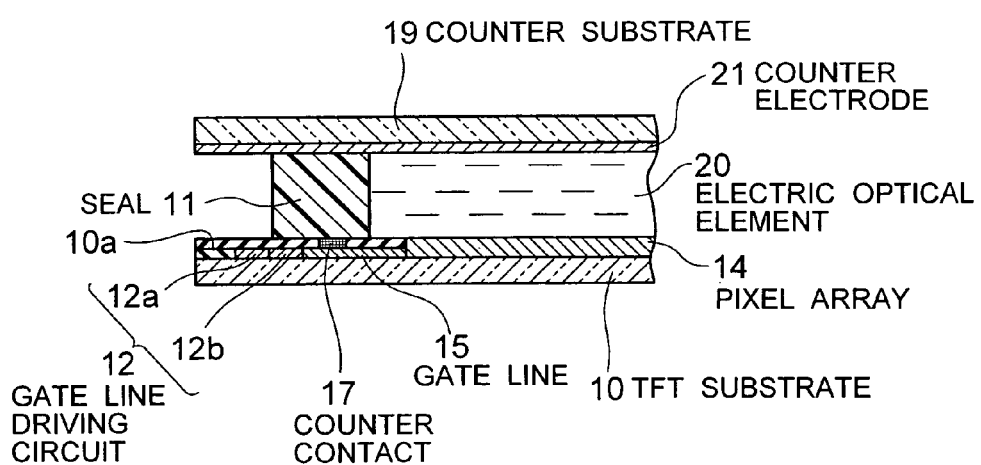

As shown in FIGS. 1A and 1B, in a display device according to an embodiment 1 of the present invention, a TFT substrate 10 and a counter substrate 19 are disposed opposite each other. A pixel array 14 is formed inside the TFT substrate 10, and a counter electrode 21 is formed inside the counter substrate 19, so that the pixel array 14 of the TFT substrate 10 and the counter electrode 21 of the counter substrate 19 face each other. In a position outside the pixel array 14, a gap in the periphery between the TFT substrate 10 and the counter substrate 19 is sealed with a frame-shaped seal 11. As shown in FIG. 1B, an end part of the TFT substrate 10 is protruded outward from the seal 11 so as to form a gate line driving circuit 12 described later, and corresponding to the dimension of the protruded end part of the TFT substrate 10, an end part of the counter substrate 19 is protruded outward from the seal 11 similarly.

On the TFT substrate 10, a data line driving circuit 13 is formed in an area outside the pixel array 14, and pixels of the pixel array 14 and the data line driving circuit 13 are connected via data lines 16. The data line driving circuit 13 is a circuit for supplying video signals to pixels of the pixel array 14 via the data lines 16.

As shown in FIG. 1B, an electric optical element 20 is filled in the space defined by the TFT substrate 10, the counter substrate 19 and the seal 11. The electric optical element 20 may be an element (e.g. liquid crystal) in which the transmission factor thereof varies depending on an electric field applied between the pixel array 14 and the counter electrode 21, or an element (e.g., EL) in which the luminescent intensity varies depending on an electric field applied between the pixel array 14 and the counter electrode 21, or an element (e.g., LED) which illuminates by flowing current to the pixel array 14.

In FIG. 1B, the seal 11 serves as a gap regulating unit for defining the substrate gap between the TFT substrate 10 and the counter substrate 19. The configuration of the seal 11 is not limited to that shown in FIG. 1B. That is, the seal 11 may have such a configuration that a gap regulating unit such as a metal piece for defining the gap between the TFT substrate 10 and the counter substrate 19 is mixed in the resin constituting the seal 11. Further, the resin constituting the seal 11 may have conductivity by mixing conductive particles in the resin constituting the seal 11, and if a transfer electrode is provided outside the area of the seal 11, it may not be included.

Next, the gate line driving circuit 12 which is a characteristic of the embodiment 1 of the present invention will be explained. The gate line driving circuit 12 is one of driver circuits for controlling pixels of the pixel array, and is for controlling the pixel array 14 via the gate lines 15. As shown in FIG. 1B, on the TFT substrate 10, an insulating film 10a is formed so as to surround the periphery of the pixel array 14. The seal 11 shown in FIG. 1B has conductivity, and one end thereof contacts the counter electrode 21 and the other end thereof contacts the insulating film 10a so as to be interposed between the TFT substrate 10 and the counter substrate 19, as shown in FIG. 1B.

The gate line 15 is formed on the TFT substrate 10, and is covered with the insulating film 10a. One end of the gate line 15 is connected with the pixel array 20, and the other end thereof extends up to the intermediate in the width direction (right and left direction in FIG. 1B) of the seal 11. In the insulating film 10a, a counter contact 17 is formed in the thickness direction, and the counter contact 17 connects the conductive seal 11 and the gate line 15. A terminal pad 18 is used for electrically connecting an outside device using a flexible cable for example, and is connected with electric wirings (not shown) for supplying control signals and power supply voltage and the like required for the gate line driving circuit 12, the data line driving circuit 14 and the pixel array 14.

The gate line driving circuit 12 is formed on the TFT substrate 10 at a position which is an extension of the gate line 15, and is covered with the insulating film 10a.

The gate line driving circuit 12 has a circuit element 12a including a node A having a period in which it is in a floating state affected by stray capacitance, and a circuit element 12b including a node B which is not affected by stray capacitance.

In the embodiment 1 of the present invention, the circuit element 12a including the node A having a period in which it is in a floating state affected by stray capacitance is formed at a position outside the seal 11, that is, the circuit element 12a is so formed as to suppress overlapping of the circuit element 12a and the seal 11 as much as possible, and in extreme, the circuit element 12a is formed apart from the seal 11. The circuit element 12b including the node B has a circuit configuration in which the voltage value falls in a range of design value even when it is affected by stray capacitance, and the circuit element 12b is formed to be in a range in the width direction of the seal 11. The floating state mentioned above means a state where the voltage value fluctuates beyond the range of design value by being affected by stray capacitance.

The gate line driving circuit 12 includes the circuit element 12b covered with the seal 11 and the circuit element 12a positioned outside the seal 11. Since the insulating film 10a exists between the gate line driving circuit 12 and the conductive seal 11 connected with the counter electrode 21 of the counter substrate 19, there is formed stray capacitance in which the gate line driving circuit 12 and the conductive seal 11 serve as electrodes.

In the embodiment 1 of the present invention, the circuit element 12a of the gate line driving circuit 12 is formed outside the seal 11, that is, in an area not covered with the seal 11. The remaining circuit element 12b is formed in an area covered with the seal 11. Note that the remaining circuit element 12b may be formed outside the seal 11. In view of the above, as for the circuit element 12a, no seal 11 serving as the counterpart of the circuit element 12a exists, so there is no stray capacitance in the area of the circuit element 12a. Therefore, the circuit element 12a will not be affected by the stray capacitance. Further, since the circuit element 12b is not affected by the stray capacitance, no problem will arise even if it faces the seal 11 and the stray capacitance is formed between them.

Figure 2:
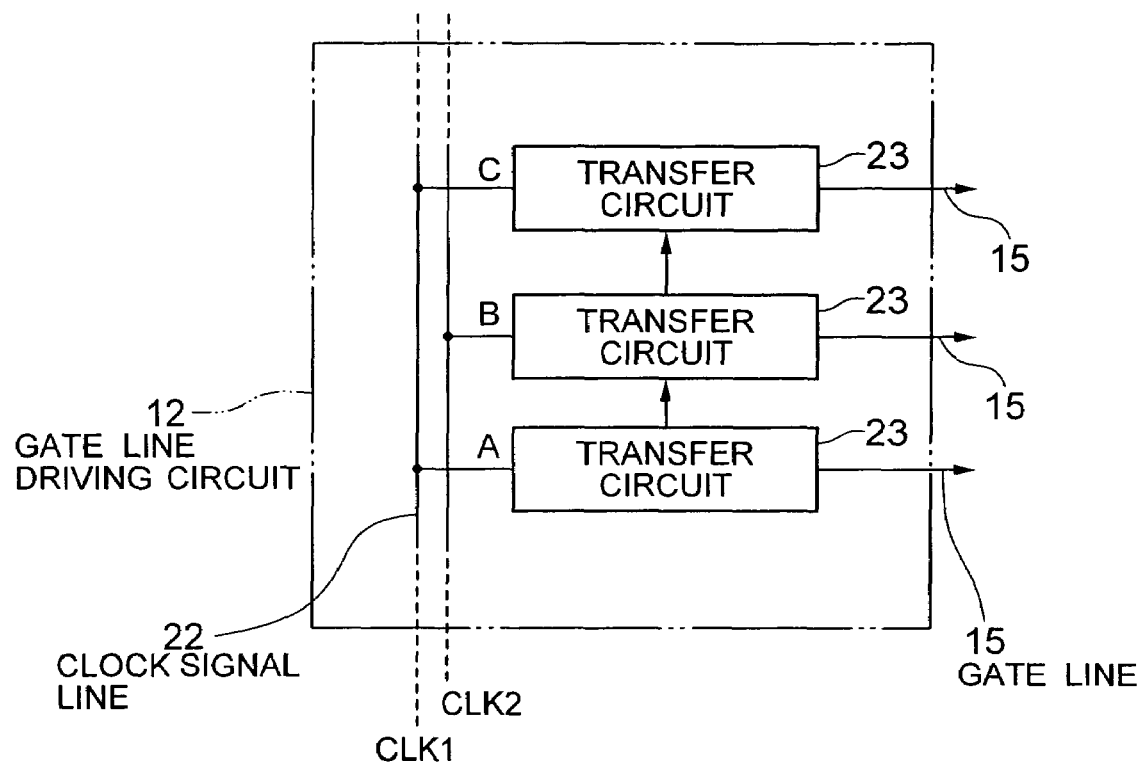
FIG. 2 is a block diagram showing the configuration of a gate line driving circuit in the embodiment 1.

Next, the circuit elements 12a and 12b will be explained in detail with a specific example. As shown in FIG. 2, the gate line driving circuit 12 consists of a combination of a clock signal line 22 and transfer circuits 23, when viewed from its functions. The clock signal line 22 supplies clock signals CLK1 and CLK2 and a signal IN to be described based on FIGS. 3 and 4. FIG. 2 shows that the clock signal line 22 supplies the clock signals CLK1 and CLK2 to the transfer circuits 23.

As shown in FIG. 2, different clock signals are supplied to adjacent transfer circuits 23. More specifically, to the transfer circuits 23 of A and C in FIG. 2, the clock signal CLK1 is supplied through the clock signal line 22, and to the transfer circuit 23 of B in FIG. 2, the clock signal CLK2 is supplied through the clock line 22, for example. Further, the signal IN is a signal which is transferred from the clock signal line 22 to the transfer circuits 23 sequentially to thereby control the transfer circuits 23 to be in an active state sequentially. The transfer circuit 23 is controlled by receiving signals of the clock signal line 22, and is a circuit having a function of transferring a control signal (signal N+1 in FIG. 3) to another transfer circuit 23 in the order of A→B→C, and a function of generating a signal to activate pixels of the pixel array 14 and supplying the signal to the gate line 15. FIG. 2 schematically shows a state of transferring the control signal as shown by the arrows, in the order of A→B→C.

Figure 3:
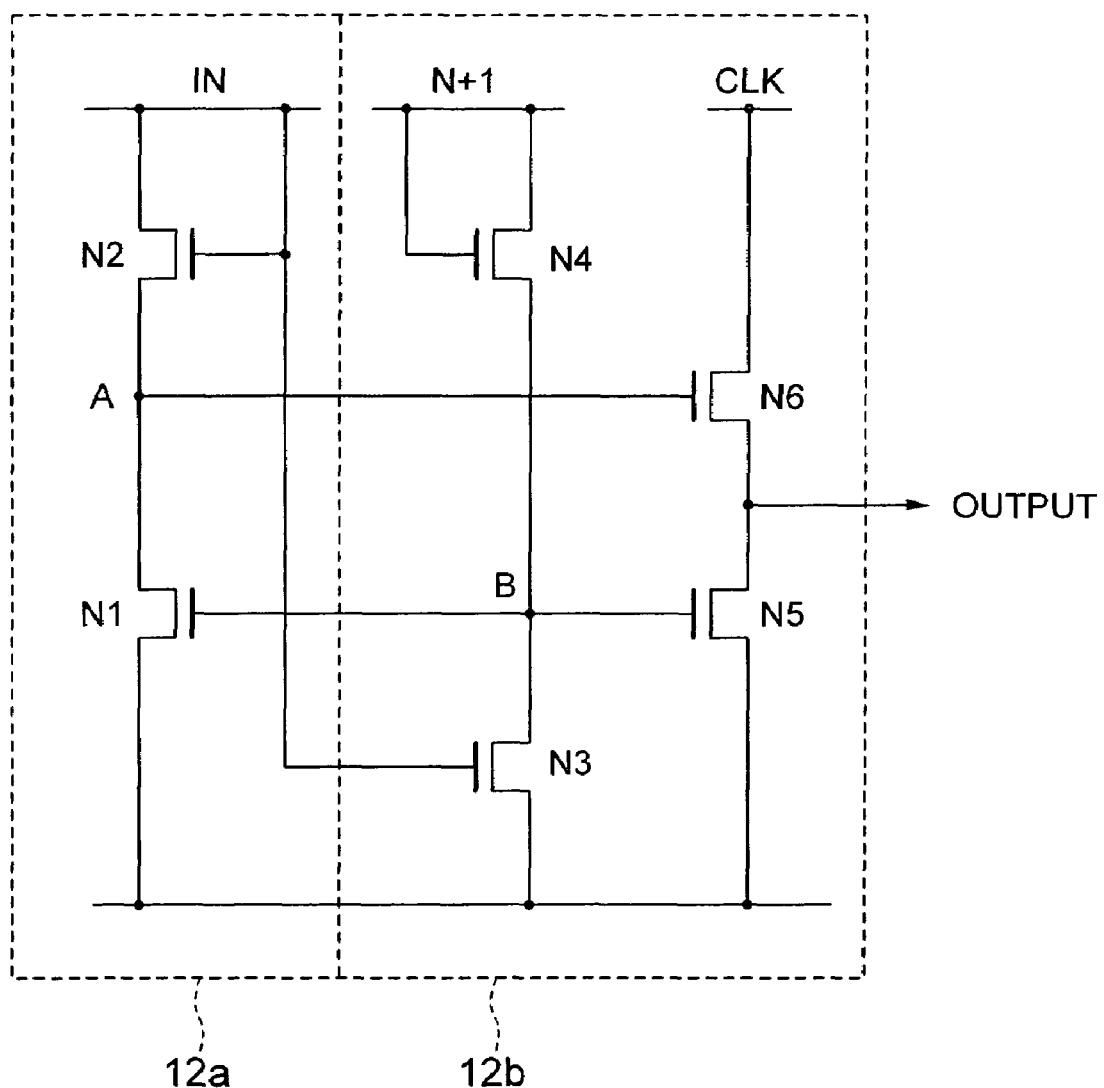
FIG. 3 is a circuit diagram showing an exemplary configuration of a transfer circuit in the embodiment 1.

As shown in FIG. 3, the transfer circuit 23 consists of NMOS-type thin film transistors N1 to N6. The transfer circuit 23 corresponds to the circuit element 12a and the circuit element 12b of the gate line driving circuit 12. The circuit element 12a has a circuit structure including the thin film transistors N1 and N2 and the node A positioned at a junction point of the source of the thin film transistor N1 and the drain of the thin film transistor N2. The circuit element 12b has a circuit structure including the thin film transistors N3, N4, N5 and N6, and the node B positioned at a junction point of the drain of the thin film transistor N4 and the source of the thin film transistor N3.

Figure 4A:
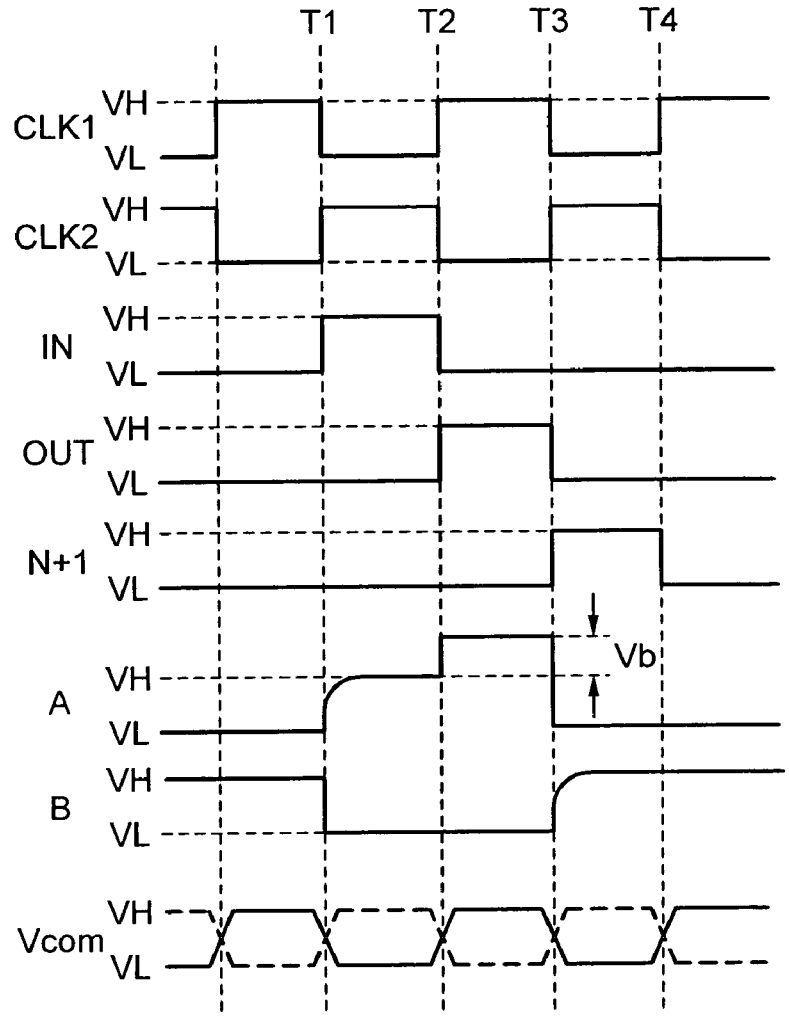

Output signals of the transfer circuits 23 are outputted to the gate lines 15. A signal IN in FIG. 3 corresponds to the above-mentioned signal IN, and the specific content is indicated by a signal IN shown in FIG. 4A. A signal N+1 in FIG. 3 corresponds to the control signal outputted from another driving circuit 23. Further, VH and VL in FIG. 4A show voltages of Hi level and Lo level, respectively. Further, Vcom shows potential of the counter electrode 21.

Next, explanation will be given for relative positions of the circuit elements 12a and 12b of the gate line driving circuit 12, that is, the thin film transistors N1 and N6 and the nodes A and B constituting the transfer circuit 23 and the seal 11 shown in FIG. 1B, by using FIGS. 5A and 5B.

Figure 5A:
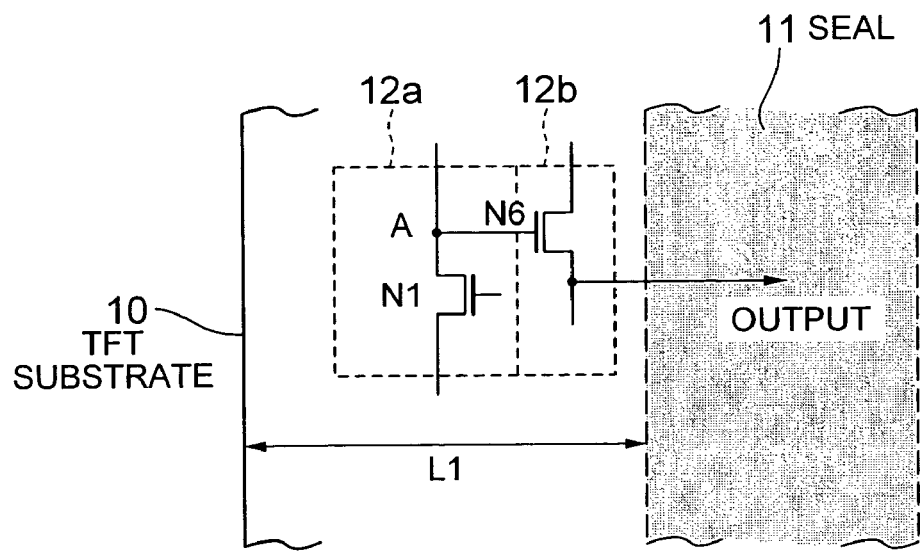
Figure 5B:
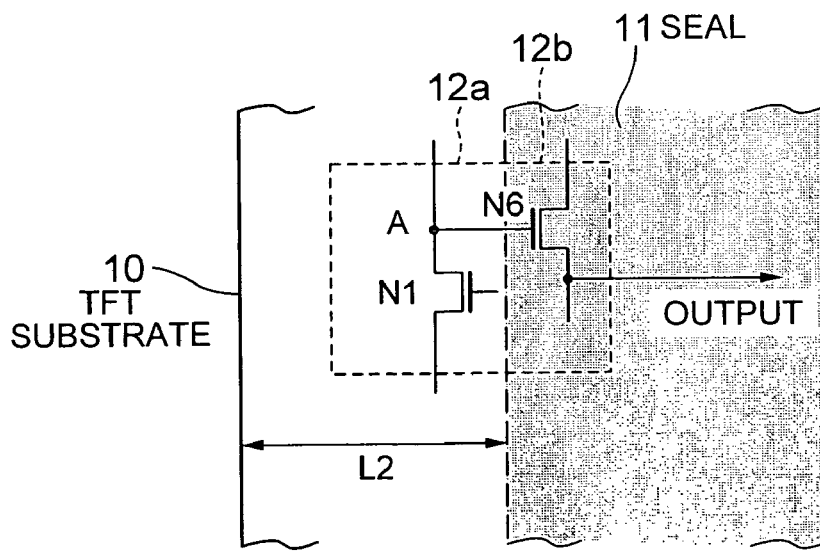

In FIGS. 5A and 5B, the circuit element 12a of the gate line driving circuit 12 is formed outside the seal 11, that is, an area not covered with the seal 11. More specifically, in FIG. 5A, the circuit element 12a including the thin film transistors N1 and N2 and the node A positioned at the junction point of the source of the thin film transistor N1 and the drain of the thin film transistor N2 is formed outside the seal 11. Similarly, the circuit element 12b including the thin film transistors N3, N4, N5 and N6 and the node B positioned at the junction point of the drain of the thin film transistor N4 and the source of the thin film transistor N3 is also formed outside the seal 11. That is, in FIG. 5A, either circuit element 12a or 12b of the gate line driving circuit 12 does not face the conductive seal 11, whereby stray capacitance is not formed between the circuit elements 12a and 12b and the conductive seal 11.

In FIG. 5B, the circuit element 12a including the thin film transistors N1 and N2 and the node A positioned at the junction point of the source of the thin film transistor N1 and the drain of the thin film transistor N2 is formed outside the seal 11. On the other hand, the circuit element 12b including the thin film transistors N3, N4, N5 and N6 and the node B positioned at the junction point of the drain of the thin film transistor N4 and the source of the thin film transistor N3 is formed within the area of the seal 11. That is, in FIG. 5B, the circuit element 12a of the gate line driving circuit 12 does not face the conductive seal 11, whereby stray capacitance is not formed between the circuit element 12a and the conductive seal 11, but the circuit element 12b faces the conductive seal 11, so stray capacitance is formed between the circuit element 12b and the conductive seal 11.

Next, operation of the display device according to the embodiment 1 of the present invention will be explained by using FIGS. 1, 3 and 4. A control signal from an outside device, not shown, is inputted to the terminal pad 18 in FIG. 1A, and with an input of the control signal, clock signals of the outside device are transferred sequentially to the data line driving circuit 13 and the gate line driving circuit 12 so as to control pixels of the pixel array 14.

More specifically, the data line driving circuit 13 supplies video signals to the pixel array 14 through the data lines 16 in accordance with a control signal from an outside device. Further, the gate line driving circuit 12 supplies a control signal to the gate line 15 for controlling the pixel array 14 in accordance with a control signal from an outside device, similar to the data line driving circuit 13. The pixel array 14 receives a control signal from the gate line driving circuit 12 and performs display operation in accordance with video signals supplied from the data line driving circuit 13.

Operation of the transfer circuit 23 will be explained with reference to FIGS. 3 and 4. First, the transfer circuit 23 of the first stage (A in FIG. 2) will be explained. To the transfer circuit 23 of the first stage, the clock signal CLK1 shown in FIG. 4A is supplied from the clock signal line 22.

In the state described above, at a time T1, when the signal IN is Hi, the voltage of the node A shown in FIG. 3 is increased to a level of voltage (VH-Vt) by the TFT N2 in FIG. 3, and the voltage of the node B shown in FIG. 3 is decreased to a level of voltage VL by the TFT N3 in FIG. 3. Vt is a threshold voltage of the TFT N2 shown in FIG. 3

When the time elapsed from T1 to T2, at a time T2, when the signal IN is Lo and the clock signal CLK1 is Hi, the TFT N2 and N3 in FIG. 3 become non-conductive, so both nodes A and B are in a floating state. In this state, voltages of the gate and the source of the TFT N5 in FIG. 3 are at a level of voltage VL, respectively (Vgs=0V), whereby the TFT N5 in FIG. 3 is in a non-conductive state. If the circuit element 12a is covered with a conductive seal 11d as the conventional case, the clock signal CLK1 is Hi, so due to capacitance coupling of gate capacitance of the TFT N6 in FIG. 3 and stray capacitance formed between the circuit element 12b and the conductive seal 11, the voltage of the node A increases from the level of voltage VH by a voltage Vb. Thereby, amplitude of an output signal from the gate line driving circuit 12 finally reaches VDD.

The second stage and after will be explained. When an output signal of the transfer circuit 23 of the previous stage is inputted as a signal IN in FIG. 3 to the transfer circuit 23 of the next stage, the transfer circuit 23 of the next stage becomes an active state, whereby it operates same as the transfer circuit 23 of the first stage. In this way, output signals are supplied to each gate line 15 while being transferred sequentially in a plurality of transfer circuits 23.

Figure 4B:
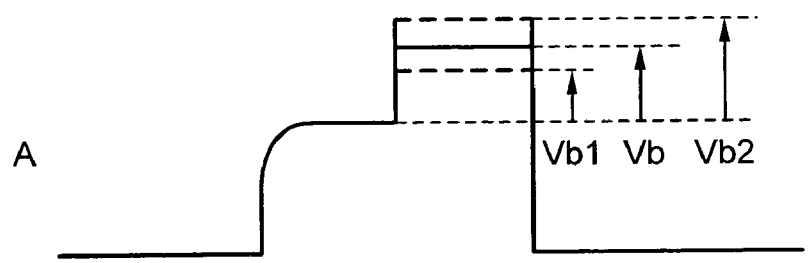

In FIG. 4A, in a period (T2 to T3) when the circuit elements 12a and 12b are in a floating state, that is, when the node A and the node B are in a floating state, if the circuit element 12a is covered with the conductive seal 11 as the conventional case, the voltage of the node A included in the circuit element 12a fluctuates to a level of voltage Vb1 or Vb2 when the voltage Vcom of the counter electrode 21 is Hi or Lo respectively, as shown in FIG. 4B. In such a case, the fluctuation of the voltage becomes larger as the capacitance value of the stray capacitance formed between the circuit element 12a including the node A and the conductive seal 11.

Further, as shown in FIG. 4B, when the voltage of the node A drops to the level of voltage Vb1, the voltage value applied to the gate of the TFT N6 in FIG. 3 drops to a design value or less, so the current driving capacity of the TFT N6 in FIG. 3 decreases whereby the operating margin of the circuit decreases. Further, as shown in FIG. 4B, when the voltage of the node A increases to the level of voltage Vb2, the voltage applied to the gate of the TFT N6 in FIG. 3 increases to a design level or more, so voltage and current stresses of the TFT N6 in FIG. 3 increase, whereby the reliability is lowered. In the case of node B included in the circuit element 12b, fluctuation of the voltage is operation within the range of the power source voltage different from the node A, so influence on the circuit operation is smaller compared with the case of node A.

As described above, in the case where the circuit elements 12a is covered with the conductive seal 11 as the conventional example, potential of the node A in a floating state due to voltage fluctuation of the counter electrode 21 also fluctuates, which causes a decrease in the operational margin and reliability of the circuit.

In order to cope with the problem described above, in the gate line driving circuit 12 of the present embodiment, the circuit element 12a including the node A is disposed outside the conductive seal 11 in the example shown in FIG. 5A. Therefore, the circuit element 12a does not face the conductive seal 11 whereby the stray capacitance will not be formed so no influence will be placed due to the stray capacitance. Accordingly, the voltage fluctuation in the circuit element 12a including the node A can be suppressed to the level of voltage Vb1 shown in FIG. 4B or less, whereby a decrease in the operational margin and reliability can be suppressed even when the voltage fluctuation occurs in the counter electrode 21.

Further, in the example shown in FIG. 5B, the circuit element 12a including the node A affected by the stray capacitance is formed outside the conductive seal 11 so as to prevent the stray capacitance from being formed between the circuit element 12a and the conductive seal 11. Further, the circuit element 12b including the node B is formed within the area of the conductive seal 11, so the stray capacitance is formed between the circuit element 12b and the conductive seal 11. However, as described above, the node B included in the circuit element 12b will never be affected by the voltage fluctuation of the counter electrode 21 due to the presence of stray capacitance even though a period of floating state exists.

Further, as shown in FIG. 5B, since the circuit element 12b including the node B is formed by being retracted in the area of the conductive seal 11, it has an advantage which cannot be achieved in FIG. 5A. That is, in the case of FIG. 5A, both circuit elements 12a and 12b are formed outside the conductive seal 11, and the protruding amount is L1. On the other hand, in the case shown in FIG. 5B, only circuit element 12a is positioned outside the conductive seal 11 and the circuit element 12b is formed by being retracted in the area of the conductive seal 11, so the protruding amount of the circuit element 12a is L2. When comparing FIG. 5A with FIG. 5B, it is obvious that the protruding amounts L1 and L2 are in the relationship of L1>L2, whereby the width dimension of the frame which must be secured in the outer periphery of the TFT substrate 10 and the counter substrate 19 outside the seal 11 can be reduced. Therefore, it has an advantage of contributing to minimization of the display size.

Next, a method of manufacturing the display device according to the embodiment 1 of the present invention will be explained. FIGS. 6A to 6G show a process of manufacturing the TFT substrate 10 consisting of an NMOS TFT by means of a polysilicon TFT technique on a glass substrate.

First, as shown in FIG. 6A, a silicon oxide film 31 is formed on a glass substrate 30. Then, amorphous silicon 32 is grown on the silicon oxide film 31. The silicon oxide film 31 is interposed between the glass substrate 30 and the amorphous silicon 32 so as to reduce an influence placed by the glass substrate 30 on the amorphous silicon 32. Then, anneal is performed by using an excimer laser to thereby make the amorphous silicon 32 into polysilicon.

Next, as shown in FIG. 6B, the amorphous silicon 32 is patterned through photoresist and etching processes to thereby form a polysilicon film 32' on the silicon oxide film 31. Further, as shown in FIG. 6C, after photoresist is applied all over the face and exposed, patterning is performed so as to form photoresist 33. Then, by doping phosphorus (P), n-channel source and drain regions are formed.

Next, as shown in FIG. 6D, after a silicon oxide film 34 having a film thickness of about 90 nm is grown all over the substrate, a layer consisting of micro crystal silicon (μ-c-Si) and tungsten silicide (WSi) for example is grown and patterned to thereby form gate electrodes 35.

Next, as shown in FIG. 6E, an interlayer film 37 formed of a silicon oxide film or a silicon nitride film is laminated, and contact holes 38 are formed in the interlayer film 37 as shown in FIG. 6F.

Next, as shown in FIG. 6G, an electrode layer made of aluminum or chrome is formed through sputtering for example, and the electrode layer is patterned so as to make the electrode layer 39 in a state of being connected with the gate electrode 35 via the contact holes 38.

Through the steps described above, NMOS TFT of the pixel array 14, NMOS TFT of the data line driving circuit 15, NMOS TFT of the gate line driving circuit 12 and stray capacitance are formed. In this case, as shown in FIGS. 1B, 5A and 5B, in the present embodiment, the node A (see FIGS. 5A and 5B) serving as the circuit element 12a shown in FIG. 1B, in the gate line driving circuit 12, is formed by being shifted outward in a lateral direction by a distance L from the position of the seal 11 formed in the subsequent step. Thereby, when the seal 11 is formed in the subsequent step, the node A is positioned outside the seal 11 as shown in FIGS. 5A and 5B.

Note that in the present embodiment, the polysilicon film 32' is formed by using an excimer laser, but another laser such as a CW laser which oscillates continuously may be used, or a solid phase growth by a heat treatment may be used. As described above, the TFT substrate 10 made of polysilicon is formed on the glass substrate 30 through the steps shown in FIGS. 6A to 6G. As a merit of the manufacturing processes of the TFT substrate 10, dense wiring is possible on a large-area substrate. This contributes to a realization of a display device having a high definition pixel array 14.

Next, as for a process of producing the counter substrate 19, it has such a configuration that the counter electrode 21 is laminated on the counter substrate 19 as shown in FIG. 1B. However, in a color filter or the case where a liquid crystal material is used as the electric optical element 20, an orientation film or the like is laminated actually.

After the TFT substrate 10 and the counter substrate 19 are produced, the process moves to superposing. It is desirable that the TFT substrate 10 and the counter substrate 19 be adhered after applying the seal 11 in which a metallic material is included in the seal material in advance by screen printing or dispenser or the like. Through the process described above, the display device of the embodiment 1 is produced.

Embodiment 2

In the embodiment 1 shown in FIGS. 3 to 5, NMOS TFT are used as the thin film transistors N1 to N6 constituting the transfer circuit 23 of the gate line driving circuit 12. However, the present invention is not limited to this configuration. A PMOS TFT may be used as the thin film transistor. A case of using a PMOS TFT will be explained as an embodiment 2.

A display device according to the embodiment 2 has the same configuration as that shown in FIGS. 1A and 1B except that PMOS TFT are used as thin film transistors constituting the transfer circuit 23 of the gate line driving circuit 12. Further, in the embodiment 2, the configuration of the gate line driving circuit 12 is same as that shown in FIG. 2, except that PMOS TFT are used as thin film transistors P1 to P6 as shown in FIG. 7, which is different from the embodiment 1.

The display device of the embodiment 2 is different from the embodiment 1 in that PMOS TFT are used as thin film transistors P1 to P6 of the transfer circuit 23, so operation of the display device according to the embodiment 2 will be explained by using FIGS. 7 and 8. As shown in FIG. 7, the transfer circuit 23 of the gate line driving circuit 12 according to the embodiment 2 is formed by combining PMOS-type thin film transistors P1 to P6.

Figure 7:
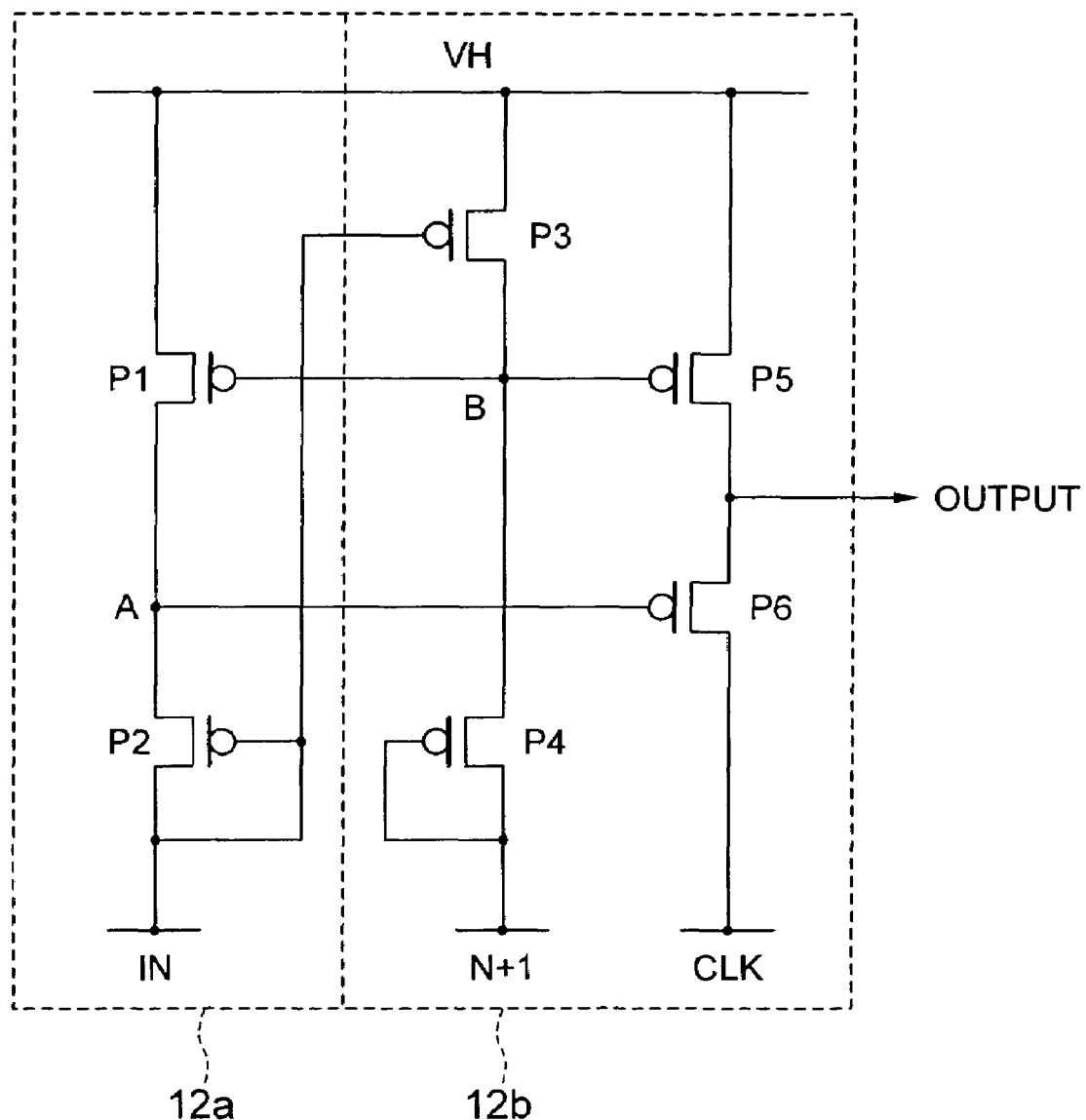
FIG. 7 is a circuit diagram showing an exemplary configuration of a transfer circuit in an embodiment 2.

As shown in FIG. 7, the transfer circuit 23 is configured of NMOS-type thin film transistors P1 to P6. The transfer circuit 23 corresponds to the circuit element 12a and the circuit element 12b of the gate line driving circuit 12. The circuit element 12a has a circuit configuration including the thin film transistors P1 and P2 and the node A positioned at a junction point of the source of the thin film transistor P1 and the drain of the thin film transistor P2. The circuit element 12b has a circuit configuration including the thin film transistors P3, P4, P5 and P6 and the node B positioned at a junction point of the drain of the thin film transistor P4 and the source of the thin film transistor P3.

Next, relative positions of the circuit elements 12a and 12b of the gate line driving circuit 12, that is, the thin film transistors P1 and P6 and the nodes A and B constituting the transfer circuit 23 and the seal 11 shown in FIG. 1B will be explained by using FIGS. 9A and 9B.

Figure 9A:
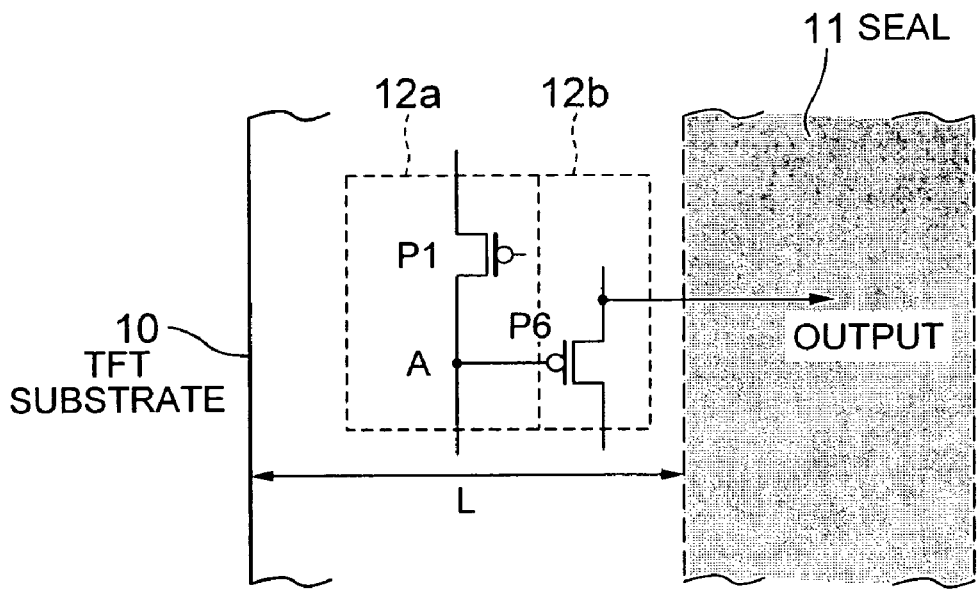
Figure 9B:
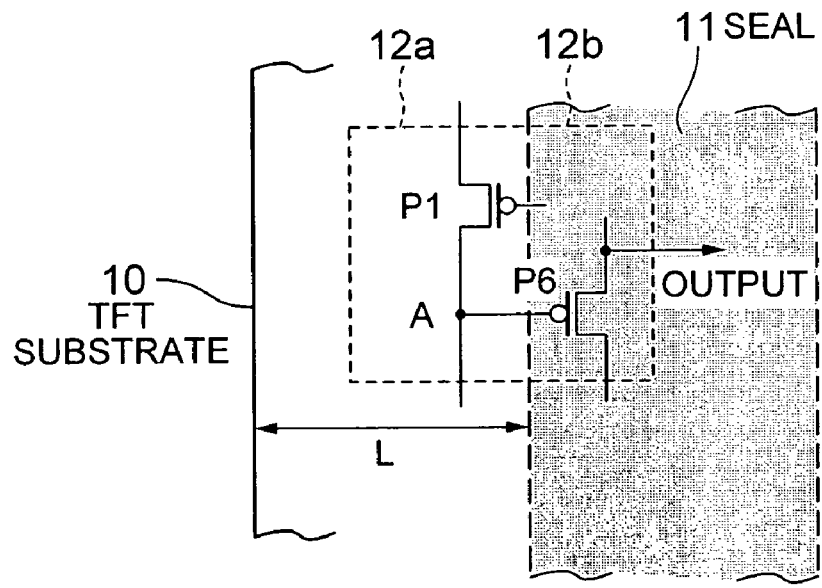

In FIGS. 9A and 9B, the circuit element 12a of the gate line driving circuit 12 is formed outside the seal 11, that is, an area not covered with the seal 11. More specifically, in FIG. 9A, the circuit element 12a including the thin film transistors P1 and P2 and the node A positioned at the junction point of the source of the thin film transistor P1 and the drain of the thin film transistor P2 is formed outside the seal 11. Similarly, the circuit element 12b including the thin film transistors P3, P4, P5 and P6 and the node B positioned at the junction point of the drain of the thin film transistor P4 and the source of the thin film transistor P3 is also formed outside the seal 11. That is, in FIG. 9A, either circuit element 12a or 12b of the gate line driving circuit 12 does not face the conductive seal 11, whereby stray capacitance is not formed between the circuit elements 12a and 12b and the conductive seal 11.

In FIG. 9B, the circuit element 12a including the thin film transistors P1 and P2 and the node A positioned at the junction point of the source of the thin film transistor P1 and the drain of the thin film transistor P2 is formed outside the seal 11. On the other hand, the circuit element 12b including the thin film transistors P3, P4, P5 and P6 and the node B positioned at the junction point of the drain of the thin film transistor P4 and the source of the thin film transistor P3 is formed within the area of the seal 11. That is, in FIG. 9B, the circuit element 12a of the gate line driving circuit 12 does not face the conductive seal 11, so stray capacitance is not formed between the circuit element 12a and the conductive seal 11. In contrast, the circuit element 12b faces the conductive seal 11, so stray capacitance is formed between the circuit element 12b and the conductive seal 11.

For those having the same configurations as those of the embodiment 1, operations are also same as the embodiment 1. Hereinafter, operation of the transfer circuit 23 shown in FIG. 7 having the configuration unique to the embodiment 2 will be explained with reference to FIGS. 7, 8A and 8B.

Figure 8A:
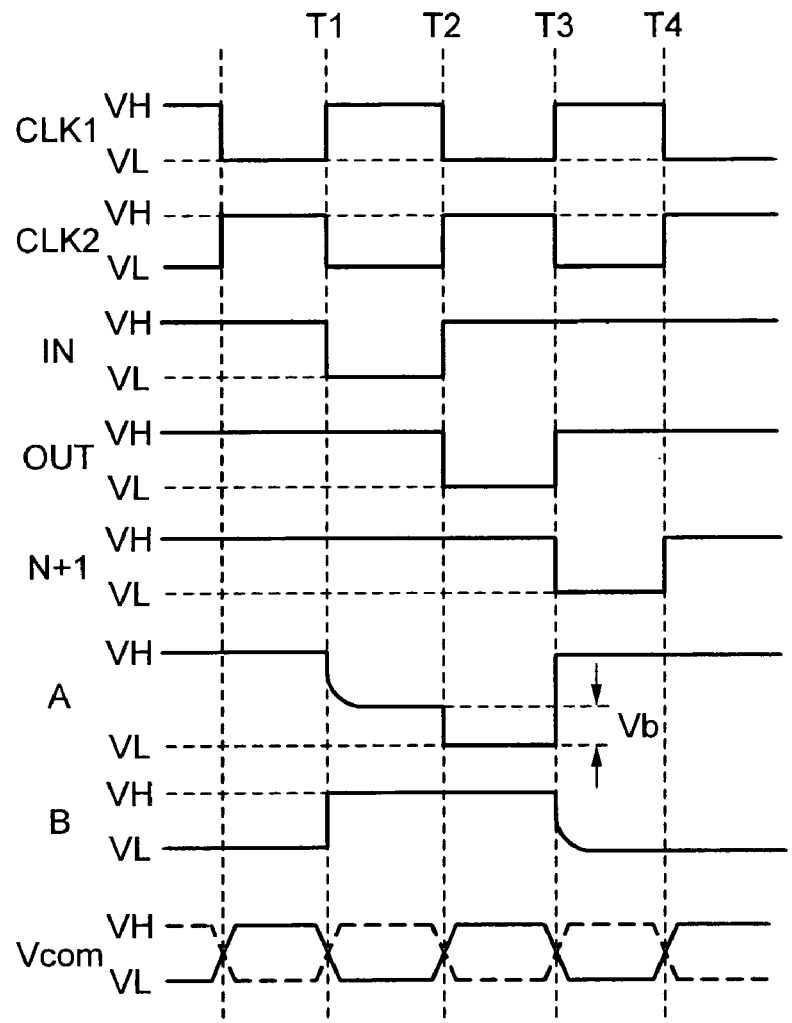

First, explanation will be given for the transfer circuit 23 of the first stage (A in FIG. 2). Here, a signal CLK 1 shown in FIG. 8A is supplied to a CLK terminal in FIG. 7. First, when a signal IN is Lo at a time T1 shown in FIG. 8A, the node A is discharged to a level of the voltage VL by the TFT P2 shown in FIG. 7, and the node B is discharged to the level of voltage VH by the TFT P3 shown in FIG. 7. Then, when the time elapsed from T1 to T2 and the signal IN is Hi at the time T2, the TFT P2 and the TFT P3 shown in FIG. 7 become non-conductive, whereby both nodes A and B are in a floating state.

In the above-described state, in the TFT P5 shown in FIG. 7, the gate and the source are in the level of voltage VH respectively (Vgs=0V), so they are in a non-conductive state. If the circuit element 12a is covered with the conductive seal 11 as the conventional case, the signal CLK 1 is Lo, so due to capacitance coupling of the gate capacitance of the TFT P6 shown in FIG. 7 and stray capacitance formed between the circuit element 12a and the conductive seal 11, potential of the node A further drops by Vb from VL. Thereby, amplitude of an output signal finally reaches VSS. As for the next stage and after, by inputting an output signal of the transfer circuit 23 of the previous stage to the terminal IN shown in FIG. 7, the transfer circuit 23 of the next stage becomes an active state, and the operation same as that of the first stage is performed. In this way, output signals are supplied to each gate line 15 while being transferred sequentially.

Figure 8B:
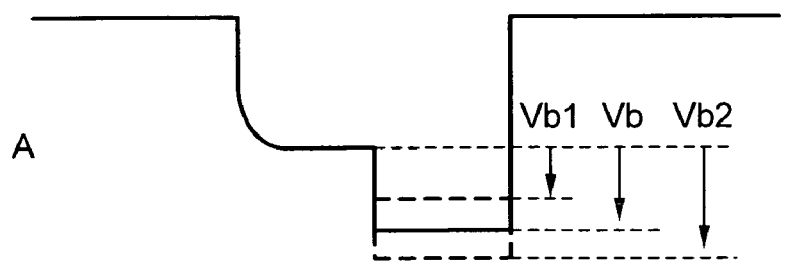

In the gate line driving circuit 12 in the embodiment 2, there is also a period in which the node A is in a floating state, as same as the embodiment 1. Therefore, due to fluctuation of the voltage Vcom of the counter electrode 21, the voltage Vb of the node A fluctuates to a voltage Vb1 or Vb2 as shown in FIG. 8B, which causes a decrease in the operational margin and reliability.

In order to cope with the problem described above, in the gate line driving circuit 12 of the present embodiment, the circuit element 12a including the node A is disposed outside the conductive seal 11 in the example shown in FIG. 9A. Therefore, the circuit element 12a does not face the conductive seal 11 whereby the stray capacitance will not be formed so no influence will be placed due to the stray capacitance. Accordingly, the voltage fluctuation in the circuit element 12a including the node A can be suppressed to the level of the voltage Vb1 shown in FIG. 8B or less, whereby a decrease in the operational margin and reliability can be suppressed even when the voltage fluctuation occurs in the counter electrode 21.

Further, in the example shown in FIG. 9B, the circuit element 12a including the node A affected by the stray capacitance is formed outside the conductive seal 11 so as to prevent the stray capacitance from being formed between the circuit element 12a and the conductive seal 11. On the other hand, the circuit element 12b including the node B is formed within the area of the conductive seal 11, so the stray capacitance is formed between the circuit element 12b and the conductive seal 11. However, as described above, the node B included in the circuit element 12b will never be affected by the voltage fluctuation of the counter electrode 21 due to the presence of the stray capacitance even though a period of floating state exists.

Further, as shown in FIG. 9B, since the circuit element 12b including the node B is formed by being retracted in the area of the conductive seal 11, it has an advantage which cannot be achieved in FIG. 9A. That is, in the case of FIG. 9A, both circuit elements 12a and 12b are formed outside the conductive seal 11, and the protruding amount is L1. On the other hand, in the case shown in FIG. 9B, only the circuit element 12a is positioned outside the conductive seal 11 and the circuit element 12b is formed by being retracted in the area of the conductive seal 11, so the protruding amount of the circuit element 12a is L2. When comparing FIG. 9A with FIG. 9B, it is obvious that the protruding amounts L1 and L2 are in the relationship of L1>L2, whereby the width dimension of the frame which must be secured in the periphery of the TFT substrate 10 and the counter substrate 19 outside the seal 11 can be reduced. Thereby, it has an advantage of contributing to minimization of the display device size.

Next, a method of manufacturing the display device according to the embodiment 2 of the present invention will be explained. FIGS. 10A to 10G show a process of manufacturing the TFT substrate 10 consisting of a PMOS TFT by means of a polysilicon TFT technique on a glass substrate.

Figure 10A:
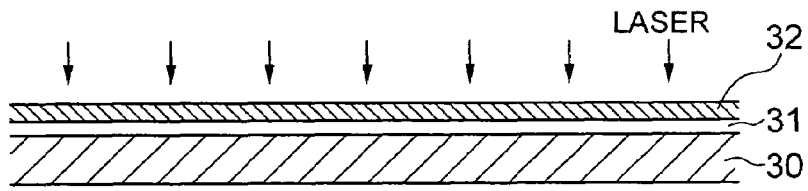
FIGS. 10A to 10G are illustrations showing a method of manufacturing the TFT substrate in the embodiment 2, in which steps progress in the order from FIG. 10A to FIG. 10G.

First, as shown in FIG. 10A, a silicon oxide film 31 is formed on a glass substrate 30. Then, amorphous silicon 32 is grown on the silicon oxide film 31. The silicon oxide film 31 is interposed between the glass substrate 30 and the amorphous silicon 32 so as to reduce an influence placed by the glass substrate 30 on the amorphous silicon 32. Then, anneal is performed by using an excimer laser to thereby make the amorphous silicon 32 into polysilicon.

Figure 10B:
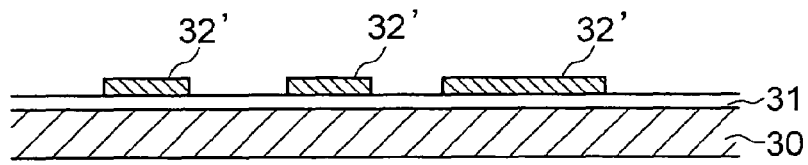
Figure 10C:
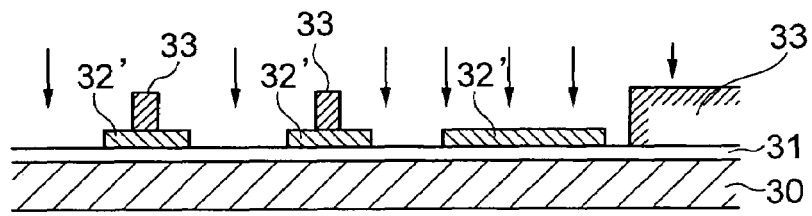

Next, as shown in FIG. 10B, the amorphous silicon 32 is patterned through photoresist and etching processes to thereby form a polysilicon film 32'. Further, as shown in FIG. 10C, after photoresist is applied all over the face and exposed, patterning is performed so as to form photoresist 33. Then, by doping boron (B), p-channel source and drain regions are formed as shown in FIG. 10C.

Figure 10D:
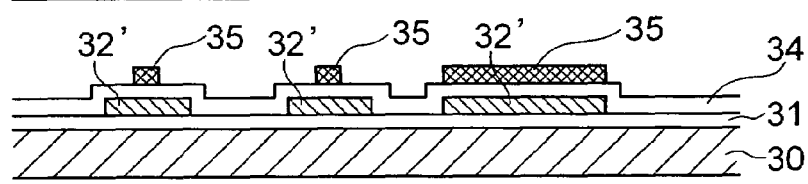

Next, as shown in FIG. 10D, after a silicon oxide film 34 having a film thickness of about 90 nm is grown all over the substrate, a layer consisting of micro crystal silicon (μ-c-Si) and tungsten silicide (WSi) for example is grown and patterned to thereby form gate electrodes 35.

Figure 10E:
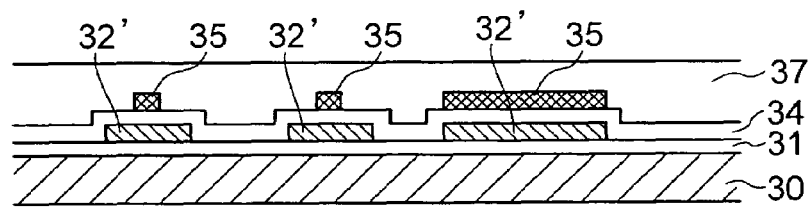
Figure 10F:
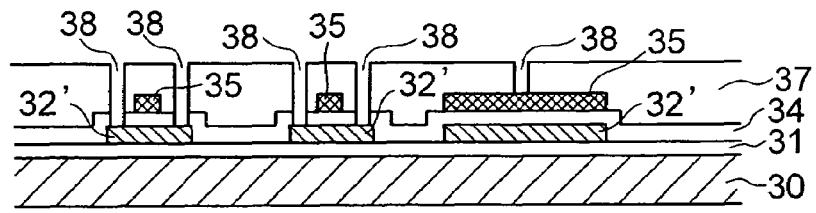

Next, as shown in FIG. 10E, an interlayer film 37 formed of a silicon oxide film or a silicon nitride film is laminated, and contact holes 38 are formed in the interlayer film 37 as shown in FIG. 10F.

Figure 10G:
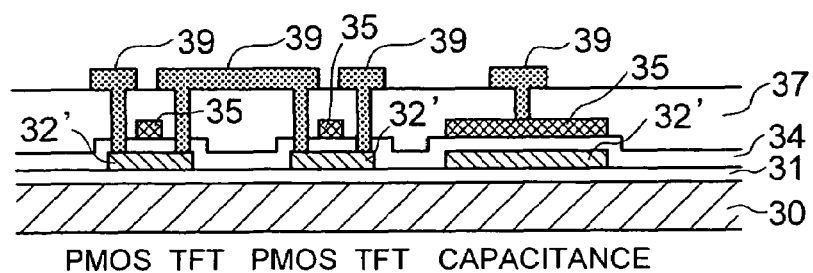

Next, as shown in FIG. 10G, an electrode layer 39 made of aluminum, chrome or the like is formed through sputtering for example, and is patterned.

Through the steps described above, PMOS TFT of the pixel array 14, PMOS TFT of the data line driving circuit 15, PMOS TFT of the gate line driving circuit 12 and stray capacitance are formed. In this case, as shown in FIGS. 1B, 9A and 9B, in the present embodiment, the node A (see FIGS. 9A and 9B) serving as the circuit element 12a shown in FIG. 1B, in the gate line driving circuit 12, is formed by being shifted outward in a lateral direction by a distance L from the position of the seal 11 formed in the subsequent step. Thereby, when the seal 11 is formed in the subsequent step, the node A is positioned outside the seal 11 as shown in FIGS. 9A and 9B.

Note that in the present embodiment, the polysilicon film is formed by using an excimer laser, but another laser such as a CW laser which oscillates continuously may be used, or a solid phase growth by a heat treatment may be used. As described above, the TFT substrate 10 made of polysilicon is formed on the glass substrate 30 through the steps shown in FIGS. 10A to 10G. As a merit of the producing process of the TFT substrate 10, dense wiring is possible on a large-area substrate. This contributes to a realization of a display device having a high definition pixel array 14.

Next, a process of producing the counter substrate 19 will be explained. In FIG. 1B, it is so configured that the counter electrode 21 is laminated on the counter substrate 19. However, in a color filter or the case where a liquid crystal member is used as the electric optical element 20, an orientation film or the like is laminated actually.

After the TFT substrate 10 and the counter substrate 19 are produced, the process moves to superposing. As the seal 11, one in which a metallic material is included in the seal material in advance is applied by screen printing or dispenser or the like. It is desirable that the TFT substrate 10 and the counter substrate 19 be adhered thereafter. Through the process described above, the display device of the embodiment 2 is produced.

Embodiment 3

In the embodiments 1 and 2, the gate line driving circuit 12 consists of thin film transistors. However, the present invention is not limited to this configuration. An example in which the circuit element 12a affected by the stray capacitance, in the gate line driving circuit 12, consists of a floating gate of a clocked inverter will be explained as an embodiment 3.

As shown in FIGS. 11 and 12, in a display device according to the embodiment 3, the gate line driving circuit 12 consists of the transfer circuit 23 corresponding to the circuit element 12a and an output circuit 24 corresponding to the circuit element 12b.

Figure 11A:
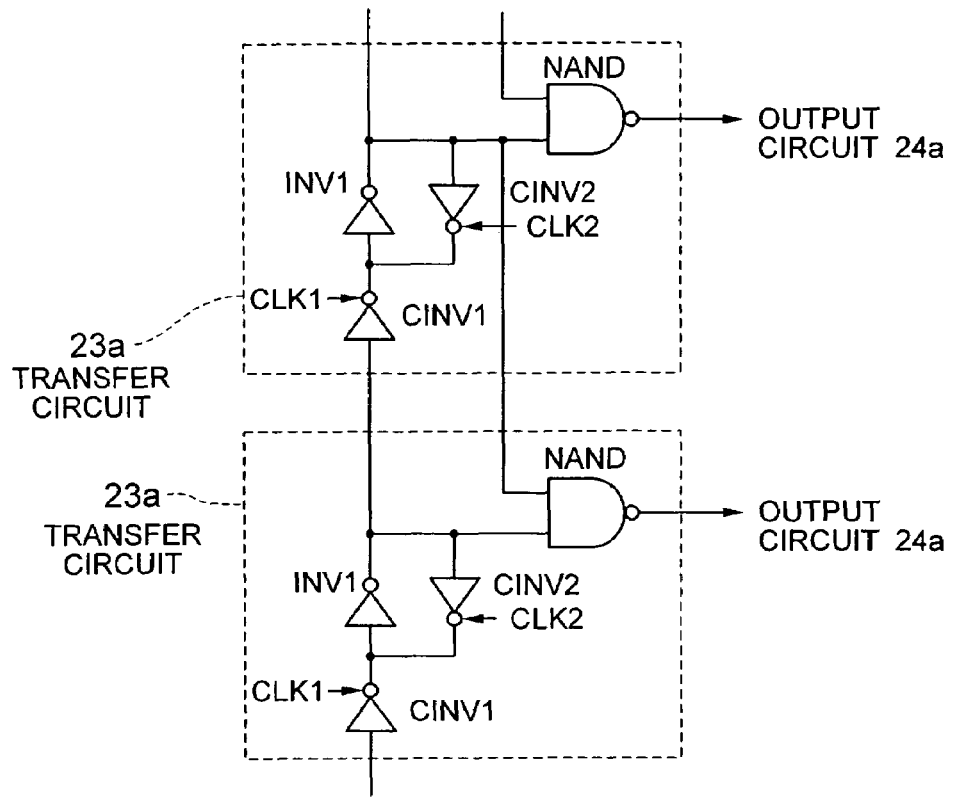
Figure 11B:
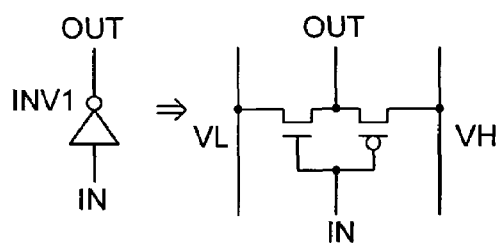
Figure 11C:
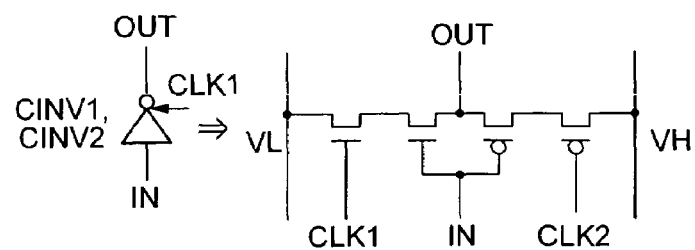

More specifically, as shown in FIG. 11A, the transfer circuit 23a corresponding to the circuit element 12a consists of a floating gate of a clocked inverter, that is, a combination of the inverter circuit INV1, clocked inverter circuits CINV1 and CINV2 and NAND. As shown in FIG. 11B, the inverter circuit INV1 may have a circuit configuration in which one NMOS TFT and one PMOS TFT are combined in a CMOS type. Further, as shown in FIG. 11C, the clock inverter circuits CINV1 and CINV2 may have a circuit configuration in which two NMOS TFT and two PMOS TFT are combined in a CMOS type. In FIG. 11A, CLK1 and CLK2 are clock signals, and the clock signal CLK2 is one that the clock signal CKL1 is reversed.

Figure 12A:
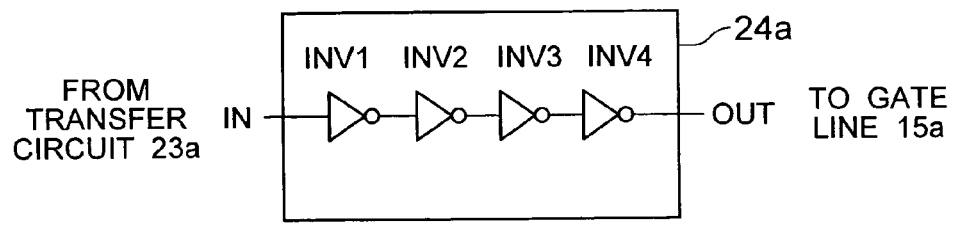
Figure 12B:
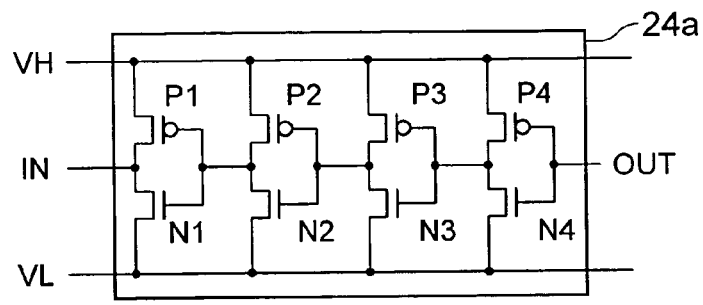

As shown in FIG. 12A, the output circuit 24 corresponding to the circuit element 12b may have a circuit configuration in which a plurality of inverter circuits INV1 to INV4 are connected in series. Further, as shown in FIG. 12B, the respective inverter circuits INV1 to INV 2 may be formed as circuits in which one NMOS TFT and one PMOS TFT are combined in a CMOS type, and the CMOS-type TFT circuits are connected in series. Other configurations are same as those shown in FIGS. 1A and 1B. Further, in the case of the embodiment 3, a circuit in which the transfer circuit 23a and the output circuit 24 in FIG. 11A corresponds to the transfer circuit 23 in the embodiment 2.

Next, relative positions of the circuit elements 12a and 12b of the gate line driving circuit 12, that is, the transfer circuit 23a and the output circuit 24, and the seal 11 shown in FIG. 1B will be explained by using FIG. 12C.

Figure 12C:
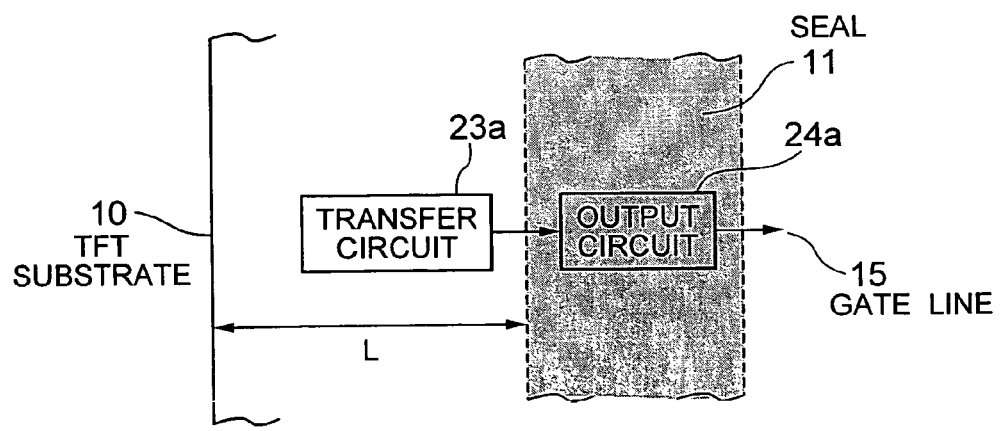
FIG. 12C is an illustration showing positions on the TFT substrate of the transfer circuit and the output circuit of the embodiment 3.

In FIG. 12C, the transfer circuit 23a which is the circuit element 12a of the gate line driving circuit 12 is formed outside the seal 11, that is, in an area not covered with the seal 11. Further, the output circuit 24 which is the circuit element 12b of the gate line driving circuit 12 is formed in the area of the seal 11. Therefore, the transfer circuit 23a which is the circuit element 12a of the gate line driving circuit 12 does not face the conductive seal 11, so stray capacitance is not formed between the transfer circuit 23a and the conductive seal 11. On the other hand, the output circuit 24 faces the conductive seal 11, so the stray capacitance is formed between the output circuit 24 and the conductive seal 11.

Next, operation of the display device according to the embodiment 3 of the present invention will be explained. The transfer circuit 23a shown in FIG. 11A is a shift register circuit consisting of a CMOS circuit, so due to latch formed of the inverter circuits INV1 and INV2, start pulse inputted via the clock inverter circuit CINV1 is synchronized with the clock signals CLK1 and CLK2, and latch and transfer are repeated. Thereby, the start pulse is transferred to the adjacent transfer circuit 23a.

If the transfer circuit 23 is covered with the conductive seal 11d as a conventional case, when the voltage of the counter electrode 21 fluctuates depending on the stray capacitance formed between the transfer circuit 23a and the conductive seal 11, the floating gate, consisting of the inverter circuits INV1 and INV2 and the clocked inverter circuits CINV1 and CINV2, causes a bootstrap effect, whereby the function of transfer circuit 23a is stopped.

As described above, when the transfer circuit 23a is covered with the conductive seal 11 as in the conventional example, the transfer circuit 23a causes a bootstrap effect due to voltage fluctuation of the counter electrode 21, which results in a decrease in the operational margin and reliability of the circuit.

In order to cope with the problem described above, in the gate line driving circuit 12 of the present embodiment, the transfer circuit 23a is disposed outside the conductive seal 11 as shown in FIG. 12C. Therefore, the transfer circuit 23a which is the circuit element 12a does not face the conductive seal 11 so the stray capacitance will not be formed whereby no influence is placed by the stray capacitance. Therefore, even if voltage fluctuation is caused in the counter electrode 21, it is possible to suppress a decrease in the operational margin and reliability.

Although the output circuit 24 corresponding to the circuit element 12b is covered with the conductive seal 11 as shown in FIG. 12C, the output circuit 24 is configured as a multistage (four-stage) inverter circuit consisting of CMOS circuits as shown in FIGS. 12A and 12B. Therefore, with the even number of stages of the inverter circuit, the Hi/Lo relationship between an input signal IN and an output signal OUT in the output circuit 24 can be maintained as a predetermined relationship. Therefore, a problem due to the output circuit 24 being covered with the conductive seal 11 will never be caused. Further, with sufficiently large TFT size (defined by channel length or channel width) of the transistors N4 and P4 constituting the inverter of the last stage shown in FIG. 12B constituting the output circuit 24, resistance load or stray capacitance load of the gate line 15 can be charged/discharged.

Further, as shown in FIG. 12C, the output circuit 24 (circuit element 12b) is formed to be retracted in the area of the conductive seal 11, whereby the protruding amount L of the transfer circuit 23a (circuit element 12a) can be suppressed as small as possible. Thereby, the width dimension of the frame which must be secured in the periphery of the TFT substrate 10 and the counter substrate 19 outside the seal 11 can be reduced, which provides an advantage of contributing to minimization of the size of the display device.

Next, a method of manufacturing the display device according to the embodiment 3 of the present invention will be explained. FIGS. 13A to 13H show a process of manufacturing the TFT substrate 10 having a CMOS configuration by means of a polysilicon TFT technique on a glass substrate.

First, as shown in FIG. 13A, the silicon oxide film 31 is formed on the glass substrate 30. Then, the amorphous silicon 32 is grown on the silicon oxide film 31. The silicon oxide film 31 is interposed between the glass substrate 30 and the amorphous silicon 32 so as to reduce an influence placed by the glass substrate 30 on the amorphous silicon 32. Then, anneal is performed by using an excimer laser to thereby make the amorphous silicon into polysilicon.

Next, as shown in FIG. 10C, the amorphous silicon 32 is patterned through photoresist and etching processes to thereby form a polysilicon film 32'.

Next, as shown in FIG. 13C, after photoresist is applied all over the face, the photoresist is exposed and patterned so as to form photoresist 33. Then, by doping phosphor (P), n-channel source and drain regions are formed.

Next, as shown in FIG. 13D, after a silicon oxide film 34 having a film thickness of about 90 nm for example is grown, a layer consisting of micro crystal silicon (μ-c-Si) and tungsten silicide (WSi) for example is grown and patterned to thereby form gate electrodes 35.

Next, as shown in FIG. 13E, photoresist 36 is applied and patterned (masking n-channel region), and boron (B) is doped so as to form p-channel source and drain regions.

Next, as shown in FIG. 13F, an interlayer film 37 formed of a silicon oxide film or a silicon nitride film is laminated, and contact holes 38 are formed in the interlayer film 37 as shown in FIG. 13G.

Next, as shown in FIG. 13H, an electrode layer made of aluminum or chrome is formed through sputtering for example, and is patterned so as to form an electrode layer 39.

Through the steps described above, PMOS TFT of the pixel array 14, PMOS TFT of the data line driving circuit 15, PMOS TFT of the gate line driving circuit 12 and stray capacitance are formed. In this case, as shown in FIGS. 1B and 12C, in the present embodiment, the transfer circuit 23a serving as the circuit element 12a shown in FIG. 1B, in the gate line driving circuit 12, is formed by being shifted outward in a lateral direction by a distance L from the position of the seal 11 formed in the subsequent step. Thereby, when the seal 11 is formed in the subsequent step, the transfer circuit 23a is positioned outside the seal 11 as shown in FIG. 12C.

In the present embodiment, the polysilicon film is formed by using an excimer laser, but another laser such as a CW laser which oscillates continuously may be used, or a solid phase growth by a heat treatment may be used. As described above, the TFT substrate made of polysilicon is formed on the glass substrate 30 through the steps shown in FIGS. 13A to 13H. As a merit of the producing processes of the TFT substrate 10, dense wiring is possible on a large-area substrate. This contributes to realization of a display device having a high definition pixel array 14.

Next, a process of producing the counter substrate 19 will be explained. Although it has such a configuration that the counter electrode 21 is laminated on the counter substrate 19 in FIG. 11, in a color filter or the case where a liquid crystal member is used as the electric optical element 20, an orientation film or the like is laminated actually. After the TFT substrate 10 and the counter substrate 19 are produced, the process moves to superposing. As the seal 11, one in which a metallic material is included in the seal material in advance is applied by screen printing or dispenser or the like. It is desirable that the TFT substrate 10 and the counter substrate 19 be adhered thereafter.

The method of producing the counter substrate 19 and the seal 11 is similar to that of the embodiment 1. Therefore, by adhering the TFT substrate 10 and the counter substrate 19 produced through the aforementioned process by using the seal 11, the display device of the embodiment 3 is manufactured.

Embodiment 4

Although, in the embodiments 1, 2 and 3, an edge of the counter electrode 21 extends up to an end of the counter substrate 19 through the seal 11 area on the counter substrate 19 side, the present invention is not limited to this configuration. An example in which the positional relationship between the seal 11 and the counter electrode 21 in the embodiments 1, 2 and 3 is changed will be explained as an embodiment 4.

In the embodiments 1, 2 and 3, on the counter substrate 19 side, an edge of the counter electrode 21 extends up to an end of the counter substrate 19 through the seal 11 area. Stray capacitance formed between the gate line driving circuit 12 and the conductive seal 11 will be considered. In the stray capacitance, when voltage is applied between the gate line driving circuit 12 and the counter electrode 21 positioned with the insulating film 10*a* as a conductor interposed between them, electric field concentrates on a part where the sectional area of the counter electrode 21 is the smallest. That is, the electric field concentrates on the edge 21*a* of the counter electrode 21. Further, the conductive seal 11 is given conductivity with conductive fine particles mixed in the resin, and in the inner part and an end face of the conductive seal 11, it does not have equal potential face uniformly but has conductive portions and non-conductive portions in a mixed manner.

Considering the above, by specifying the positions of the edge 21*a* of the counter electrode 21 and the gate line driving circuit 12, the position where the stray capacitance is formed can be controlled artificially.

In view of the above, in the embodiment 4 of the present invention, the gate line driving circuit 12 is formed to be separated into the circuit element 12*a* affected by the stray capacitance and the circuit element 12*b* not affected by the stray capacitance. In separating the gate line driving circuit 12, it is separated into the circuit element 12*a* and the circuit element 12*b* while paying attention to the nodes A and B, as the embodiments 1 and 2. Alternatively, the gate line driving circuit 12 may be separated into the transfer circuit 23*a* corresponding to the circuit element 12*a* and the output circuit 24 corresponding to the circuit element 12*b* while paying attention to the circuit configuration of the gate line driving circuit 12, as the embodiment 3. Note that in the embodiment 4, the example will be explained by using the gate line driving circuit 12 of the circuit configuration shown in the embodiment 3.

Figure 14A:
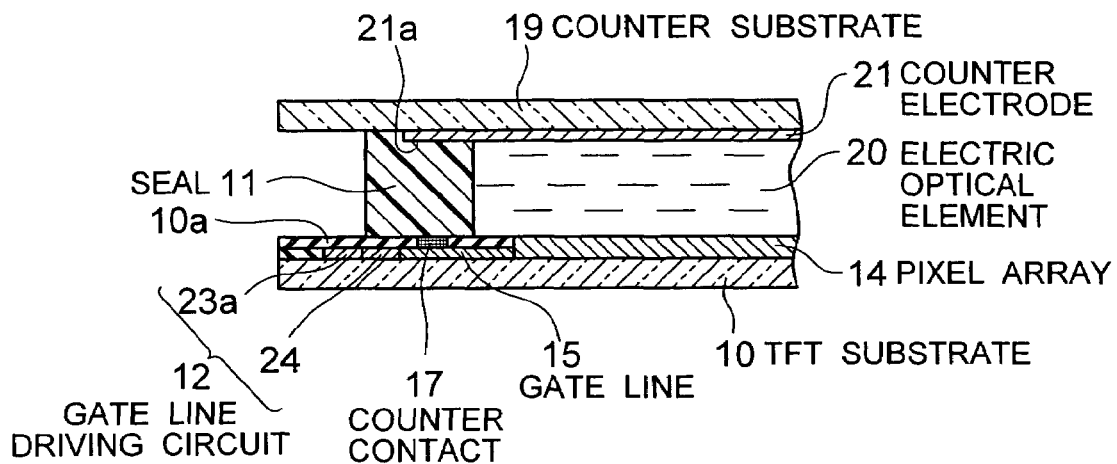
Figure 14B:
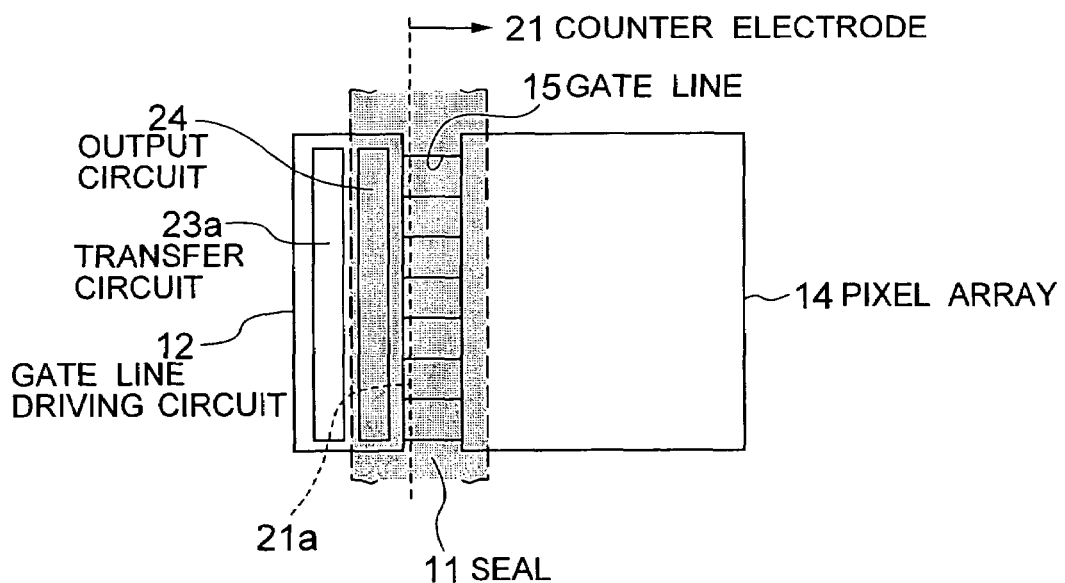

As shown in FIGS. 14A and 14B, the transfer circuit 23*a* corresponding to the circuit element 12*a* of the gate line driving circuit 12 is made to exist outside the conductive seal 11 so as to be formed at a position on the edge side of the TFT substrate 10. Further, the output circuit 24 corresponding to the circuit element 12*b* of the gate line driving circuit 12 is positioned inside the transfer circuit 23*a* so as to be formed on the TFT substrate 10. Further, the output circuit 24 and pixels of the pixel array 14 on the TFT substrate 10 are connected with the gate lines 15. Further, the outside gap between the counter substrate 19 and the TFT substrate 10 is sealed with the conductive seal 11, and the seal 11 and the gate lines 15 are connected with the counter contact 17. Note that the gate line driving circuit 12 is covered with the insulating film 10*a*, and the counter contact 17 is formed through the insulating film 10*a*.

On the counter substrate 19 side, the counter electrode 21 is formed on the counter substrate 19 by being retracted inward from an end part of the counter substrate 19, and the edge 21*a* of the counter electrode 21 is arranged at a position inside the inner edge of the output circuit 24.

In the embodiment 4 of the present invention, the edge 21*a* where electric field is concentrated, in the counter electrode 21, is arranged at a position inside the inner edge of the output circuit 24 of the gate line driving circuit 12, so stray capacitance formed between the gate line driving circuit 12 and the conductive seal 11, positioned with the insulating film 10*a* interposed between them, is formed in the area of the output circuit 24 of the gate line driving circuit 12 with a positional restriction. As described above, the output circuit 24 has a circuit configuration not affected by the stray capacitance, so no problem is caused particularly even if the stray capacitance is formed in the area of the output circuit 24 with a positional restriction.

On the other hand, the transfer circuit 23*a* of the gate line driving circuit 12 exists outside the conductive seal 11 and does not face the conductive seal 11, so the stray capacitance will never be formed in the area of the transfer circuit 23*a*. Further, since the stray capacitance is formed in concentration in the area of the output circuit 24 due to the positional relationship between the edge 21*a* of the counter electrode 21 and the output circuit 24, the transfer circuit 23*a* will never be affected by the stray capacitance.

In manufacturing the display device of the embodiment 4, the TFT substrate 10 is manufactured through the manufacturing steps described in the embodiment 1 shown in FIGS. 6A to 6G and in the embodiment 2 shown in FIGS. 10A to 10G. However, the position of the edge 21*a* of the counter electrode 21 in the embodiment 4 is different from that of the embodiment 1 or 2. Therefore, in the manufacturing process of the embodiment 1, by performing patterning a part of the counter electrode 21 which is formed to extend toward the edge side of the counter substrate 19 using photoresist as a mask, the position of the edge 21*a* of the counter electrode 21 may be retracted from the edge side of the counter substrate 19. Alternatively, the edge side of the counter substrate 19 may be masked in advance so as to form the counter electrode 21, and the edge 21a thereof may be formed at a position inside the edge of the counter substrate 21.

Embodiment 5

An example in which the seal 11 in the embodiments 1, 2, 3 and 4 described above will be explained as an embodiment 5.

In the embodiment 5, attention is paid to the function of the seal 11. The seal 11 has both a function of sealing the gap on the edge side between the TFT substrate 10 and the counter substrate 19 opposite each other, and a function of transmitting electric signals from the TFT substrate 10 side to the counter electrodes 21 of the counter substrate 19. In the case of causing the seal 11 to exhibit the two functions in the configuration of covering all of the gate line driving circuit 12 with the seal as the conventional example, it is possible to take the width dimension of the seal sufficiently.

On the other hand, in the present embodiment, the circuit element 12a of the gate line driving circuit 12 is formed outside the seal 11, so it is difficult to secure the dimension of the seal 11 in the width direction sufficiently. If the seal 11 is cut into the electric optical element 20 side so as to secure the dimension of the width direction, the area of the pixel array 14 is reduced substantially. Further, the TFT substrate 10 and the counter substrate 19 are required to secure an area for forming the circuit element 12a of the gate line driving circuit 12 at a position outside the seal 11. However, in the embodiment of the present invention, there is no seal 11 in an area for forming the circuit element 12a. In the TFT substrate 10 and the counter substrate 19, an area which is easily damaged by receiving external force is outer peripheral parts of the substrates 10 and 19. However, there is no seal in the outer peripheral parts.

In view of the fact that one seal 11 has two functions in each of the embodiments described above, the present embodiment 5 is characterized in that two different seals 11a and 11b have the two functions.

Figure 15A:
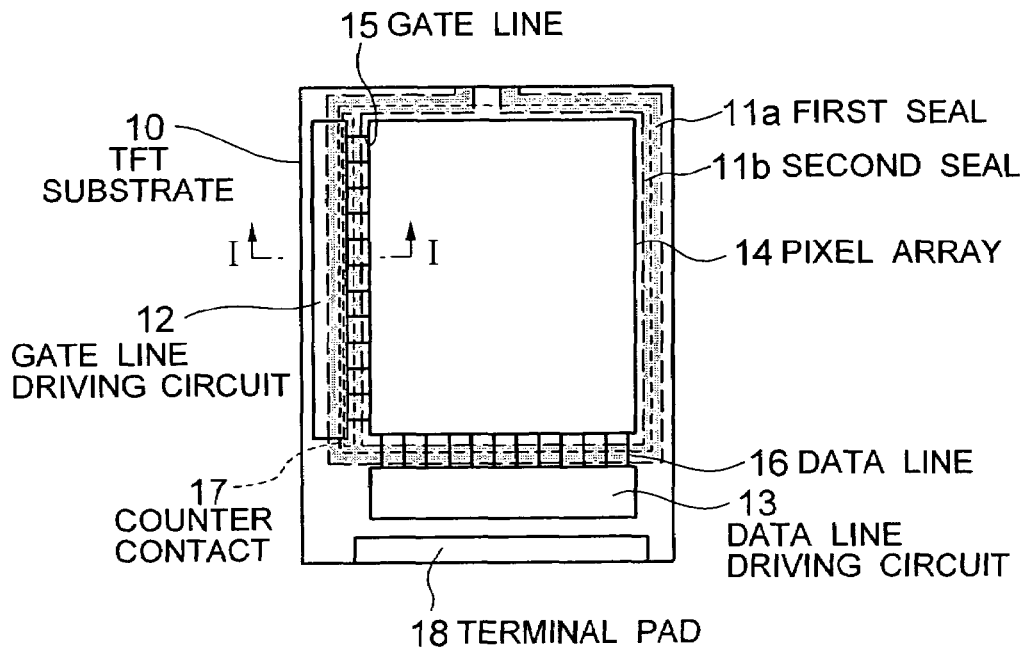
Figure 15B:
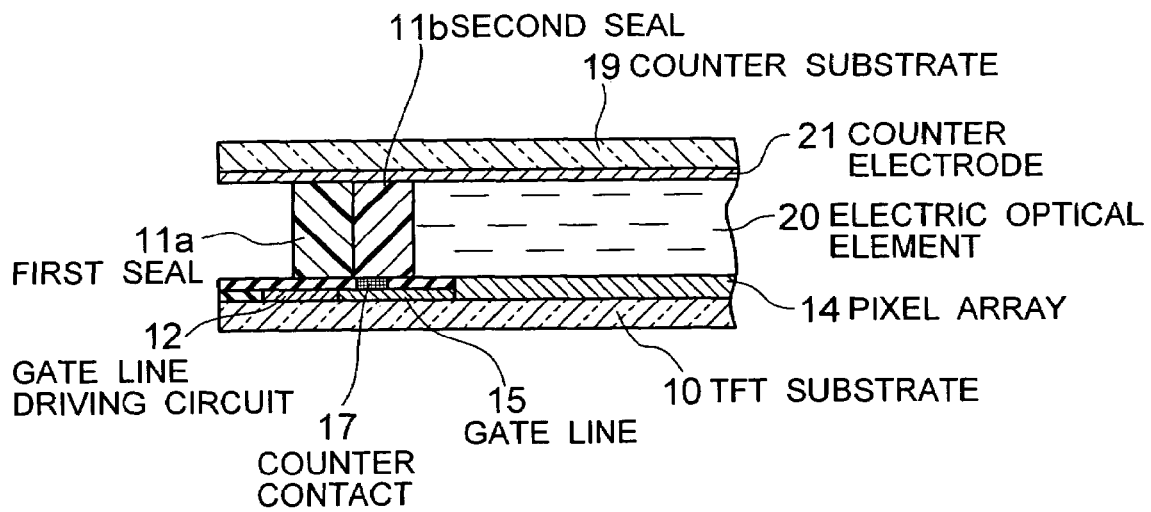

As shown in FIGS. 15A and 15B, a seal corresponding to the seal 11 consists of a combination of the conductive seal 11b disposed inside and the non-conductive seal 11a disposed outside.

In the embodiment 5, the gap of the outer peripheral part between the TFT substrate 10 and the counter substrate 19 opposite each other is sealed by using the seals 11a and 11b doubled inside and outside. Further, the circuit element 12a affected by stray capacitance, in the gate line driving circuit 12, is positioned outside the conductive seal 11b to thereby form the TFT substrate 10. Further, the non-conductive seal 11a is disposed in the area of the circuit element 12a formed outside the conductive seal 11b, whereby the dimensions in the width direction of the seals 11a and 11b are secured sufficiently.

Consideration will be given for disposing the non-conductive seal 11a which is a dielectric in the area of the circuit element 12a disposed outside the conductive seal 11b. In this configuration, the counter electrode 21 and the circuit element 12a face each other via the non-conductive seal 11a, so stray capacitance is formed between the counter electrode 21 and the circuit element 12a. However, the capacitance value of the stray capacitance is in inverse proportion to the distance between electrodes of the capacitance. The dielectric between the conductive seal 11b and the circuit element 12b is the insulating film 10a, and the dielectric between the counter electrode 21 and the circuit element 12a is the non-conductive seal 11a. Further, assuming that the distance between the conductive seal 11b and the circuit element 12b is L3 and the distance between the counter electrode 21 and the circuit element 12a is L4, they are in a relationship of L4>L3.

Therefore, the capacitance value of stray capacitance formed between the counter electrode 21 and the circuit element 12a is much smaller than the capacitance value of stray capacitance formed between the conductive seal 11b and the circuit element 12b. Therefore, the level that the circuit element 12a is affected by the stray capacitance is extremely small, whereby no problem is caused to the operation of the circuit element 12a.

In the embodiment 5, since the conductive seal 11b is disposed inside, electric signals from the TFT substrate side are transmitted to the counter electrodes 21 of the counter substrate 10 through the counter contact 17 and the conductive seal 11b. Thereby, transmission of electric signals by the seal can be performed. Further, since the seals 11a and 11b are disposed inside and outside, the dimension in the width direction of the seal can be secured sufficiently. Therefore, it is possible to protect the substrate from external force applied to the outer peripheral part of the substrates 10 and 19.

In a manufacturing method of the embodiment 5, methods of producing the TFT substrate 10 and the counter substrate 19 are similar to those described in the embodiments 1 or 2, respectively. In the embodiment 5, the configuration of the seal is different from that of other embodiments, so a method of producing the seal will be explained below. It is desirable to dispose the non-conductive seal 11a and the conductive seal 11b at predetermined position by dispenser for example respectively, but screen printing using a printing plate may be acceptable. By adhering the TFT substrate 10 and the counter substrate 19 by using the process of producing the seal 11a and the seal 11b, the display device of the embodiment 5 will be produced.

Embodiment 6

A modification of the seal 11 according to the embodiments 1 to 4 will be explained as an embodiment 6. Although the seal 11 also has a function of maintaining the gap of the outer peripheral side, among the gaps between the TFT substrate 10 and the counter substrate 19 opposite each other, at the initial value, the main function of the seal 11 is to seal the gap between the TFT substrate 10 and the counter substrate 19 opposite to each other. In the embodiments 1 to 4 described above, the circuit element 12a of the gate line driving circuit 12 is formed outside the seal 11, so the dimension in the width direction of the seal 11 must be narrow as described in the embodiment 5. Further, the TFT substrate 10 and the counter substrate 19 must secure an area for forming the circuit element 12a of the gate line driving circuit 12 at a position outside the seal 11. However, in the embodiment of the present invention, there is no seal 11 in the area for forming the circuit element 12a. In the TFT substrate 10 and the counter substrate 19, areas easily damaged by external force are the outer peripheral parts of the substrates 10 and 19, but seal does not exist in the outer peripheral parts.

Figure 16A:
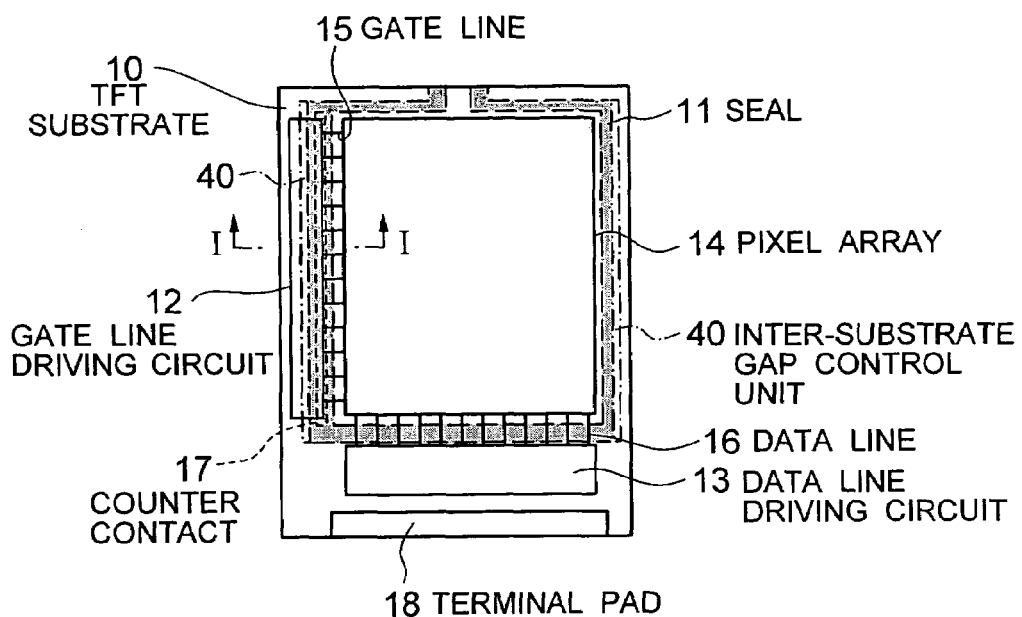
Figure 16B:
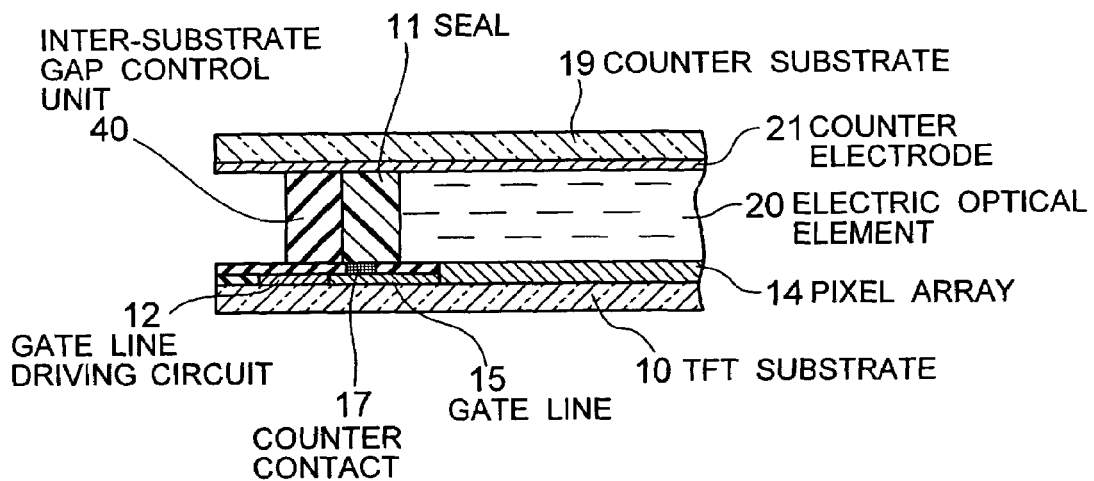

In view of the above, in the embodiment 6 of the present invention, an inter-substrate gap control unit 40 is disposed in an area, outside the seal 11, where the circuit element 12a not affected by stray capacitance is formed, as shown in FIGS. 16A and 16B. The inter-substrate gap control unit 40 is made of a non-conductive material, and is disposed in the area so as to maintain the gap between the TFT substrate 10 and the counter substrate 19 at the initial value.

As for the inter-substrate gap control unit 40, it is desirable that the deformation amount thereof be smaller than that of the seal 11 with respect to a load in an up and down direction applied to the TFT substrate 10 and the counter substrate 19 in FIG. 16B. Thereby, the panel gap between the TFT substrate 10 and the counter substrate 19 can be maintained at a design value. Further, by setting the relative dielectric constant of the inter-substrate gap control unit 40 in a range between 3.4 to 3.7 for example, that is, smaller than the relative dielectric constant of 3.5 to 4.1 of the seal 11, it is possible to suppress as small as possible the capacitance value of stray capacitance formed by the TFT substrate 10, the counter substrate 19 and the inter-substrate gap control unit 40 in the area of the circuit element 12a to thereby reduce an influence placed by the stray capacitance on the circuit element 12a.

Further, by disposing the inter-substrate gap control unit 40 outside from the seal 11, a new effect of preventing variations in disposed position of the seal 11 caused due to a "shift" in the process of the seal 11 and a "crush" of the seal 11 in the step of adhering the TFT substrate 10 and the counter substrate 19.

In a manufacturing method of the embodiment 6, methods of producing the TFT substrate 10 and the counter substrate 19 are similar to those of the embodiments 1 or 2, respectively. Further, the process of producing the seal 11 is also similar to that of the embodiment 1 and the like.

It is desirable that the inter-substrate gap control unit 40 be formed additionally in the process of producing the TFT substrate 10. After the TFT substrate 10 is produced, resists is applied again and patterned so as to form the inter-substrate gap control unit 40 at a predetermined position. The spatial resolution of this process is equal to the gate line driving circuit 12, so the relative positional accuracy of the gate line driving circuit 12 and the inter-substrate gap control unit 40 is much higher than the relative positional accuracy of the gate line driving circuit 12 and the seal 11. Note that the material of the inter-substrate gap control unit 40 is a photosensitive resin which is cured by receiving light for example.

By adhering the counter substrate 19 to the TFT substrate 10 on which the inter-substrate gap control unit 40 is formed by using the seal 11, the display device of the embodiment 6 is produced.

Embodiment 7

In the embodiments 1 to 6 described above, a transmission path of electric signals from the TFT substrate 10 side to the counter electrodes 21 is formed in a path passing the gate lines 15, the counter contact 17 and the conductive seal 11. However, the present invention is not limited to this configuration. An example in which the transmission path is modified will be explained as an embodiment 7.

Figure 17A:
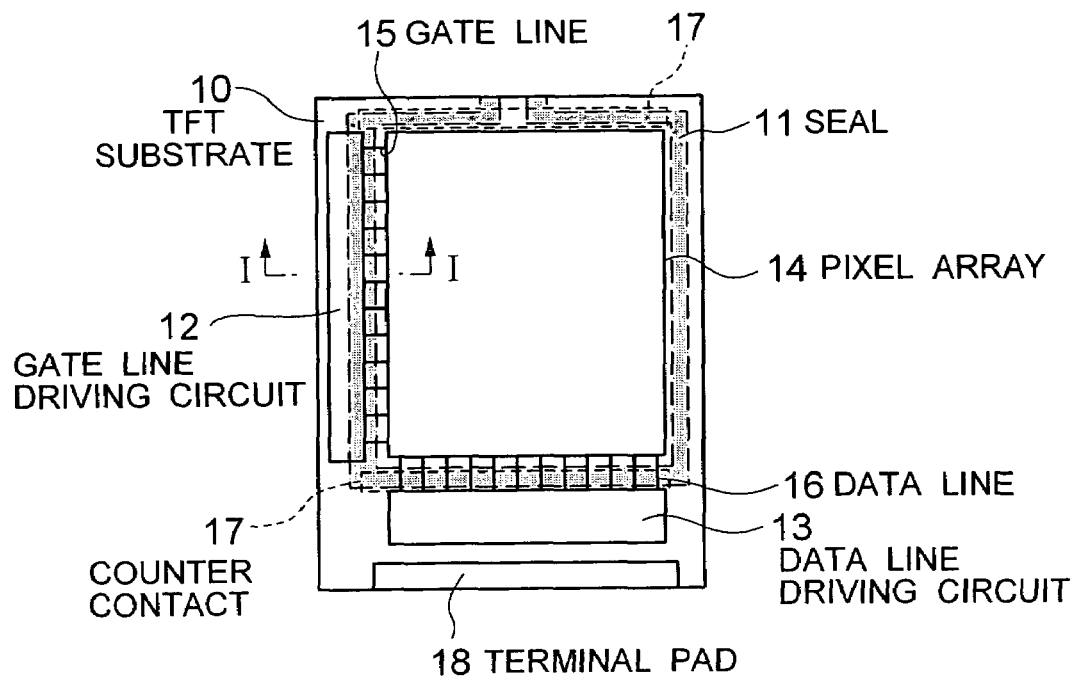

In the embodiment 7 of the present invention as shown in FIG. 17A, attention is paid to the fact that the gate line driving circuit 12 and the data line driving circuit 13 are formed along two edges, crossing each other, of the pixel array 14, whereby the counter contact 17 is formed along the remaining edges H3 and H4 other than the two edges H1 and H2 of the pixel array 14.

The seal 11 has conductivity, and is formed in a frame shape. Therefore, it is possible to transmit electric signals from the TFT substrate 10 side to the counter electrodes 21 of the counter substrate via the seal 11 of the edge H3 other than the edges H1 and H2.

In view of the above, in the embodiment 7, the counter contact 17 is formed at a position of the edge H3 where the gate line driving circuit 12 and the gate lines 15 are not formed. Further, signal lines corresponding to the gate lines 15 are formed to be connected with the counter contact 17. The signal lines have a configuration corresponding to that of the gate lines 15 and have the same configuration as that of the gate lines 15, so they are omitted in FIGS. 17A and 17B.

Further, since the data line driving circuit 13 is less affected by the stray capacitance, the signal lines corresponding to the gate lines 15 are formed by using a free space between the data line driving circuit 13 and the data lines 16, and are connected with the counter contact 17 formed at a position of the edge H2. The signal lines have a configuration corresponding to that of the gate lines 15 and have the same configuration as that of the gate lines 15, so they are omitted in FIGS. 17A and 17B.

In the embodiment 7, electric signals from the TFT substrate 10 side are transmitted to the counter electrodes 21 of the counter substrate 19 through the path of the signal lines corresponding to the gate lines, the counter contact 17, and the conductive seal 11 along the edges H2 and H3.

In the embodiment 7, the counter contact 17 does not exist in the area of the gate line driving circuit 12 which is easily affected by the stray capacitance. Considering the areas of end faces of the counter contact 17 and the conductive seal 11, the area of an end face of the counter contact 17 is smaller than that of the conductive seal 11. This means, considering from the viewpoint of a face of electric field, electric field concentrates on the end face of the counter contact 17, whereby stray capacitance having the concentrated electric field is formed.

Figure 17B:
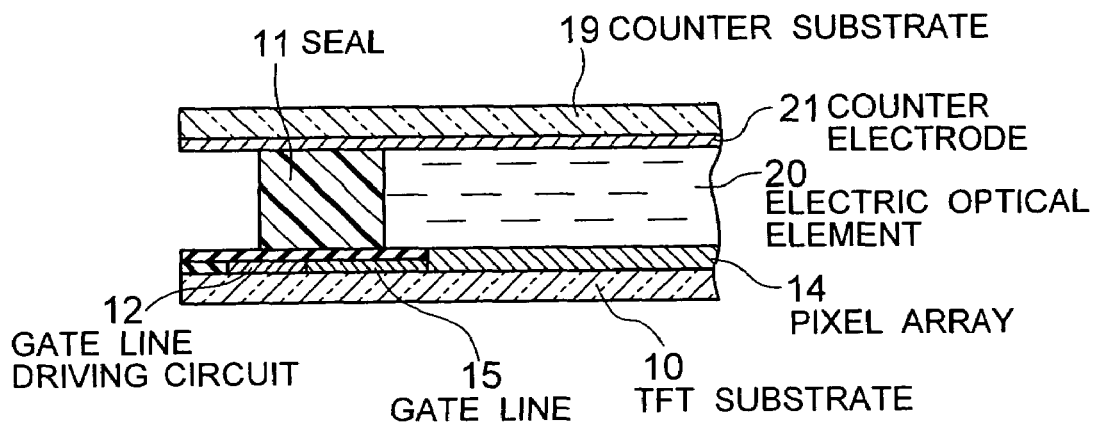

In the embodiment 7 shown in FIGS. 17A and 17B, the counter contact 17 on which electric field of stray capacitance is concentrated does not exist in the area of the gate line driving circuit 12. Therefore, it is possible to reduce the effect of potential fluctuation of the counter electrodes 21 to the gate line driving circuit 12 under the condition of stray capacitance being present.

In manufacturing the display device according to the embodiment 7, methods of producing the TFT substrate 10, the counter substrate 19 and the seal 11 are similar to those of the embodiment 1 or 2, respectively. Although the producing position of the counter contact 17 is different in the present embodiment, only the pattern in patterning is different, so there is no need to change the process particularly. Therefore, the display device of the embodiment 7 is produced through the same process as that of the embodiment 1.

Embodiment 8

Figure 18A:
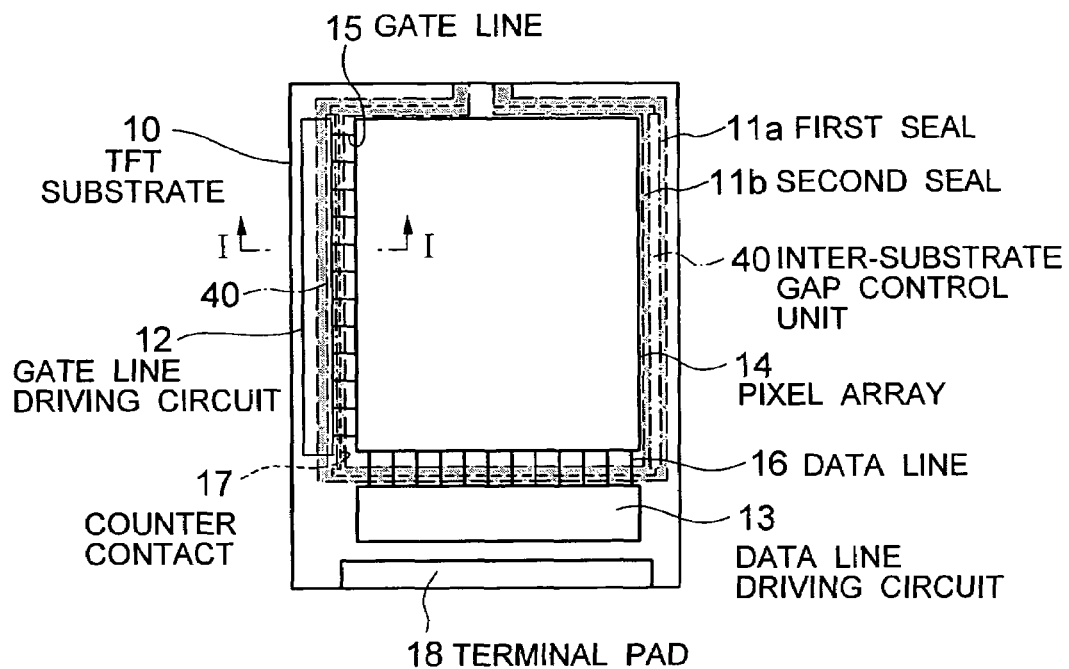
Figure 18B:
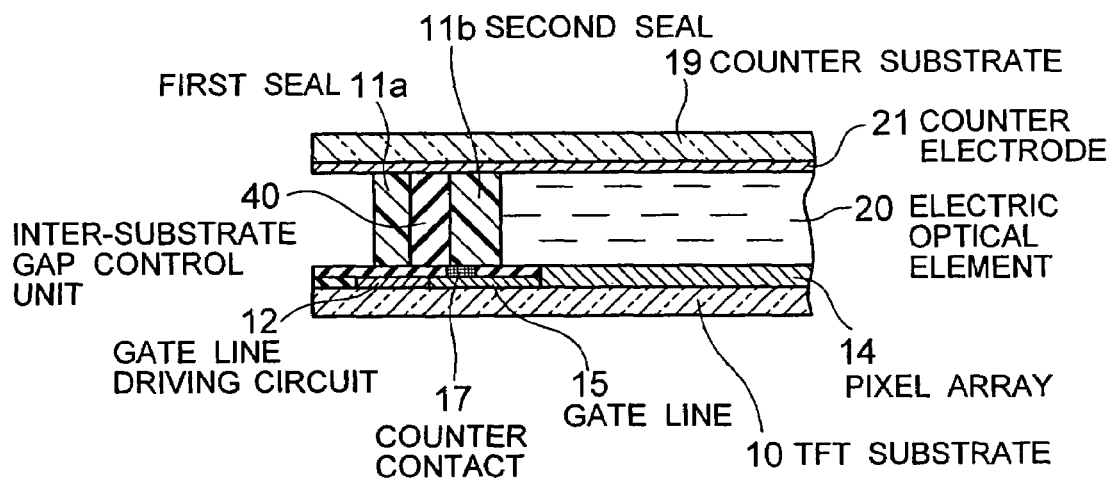
Figure 19A:
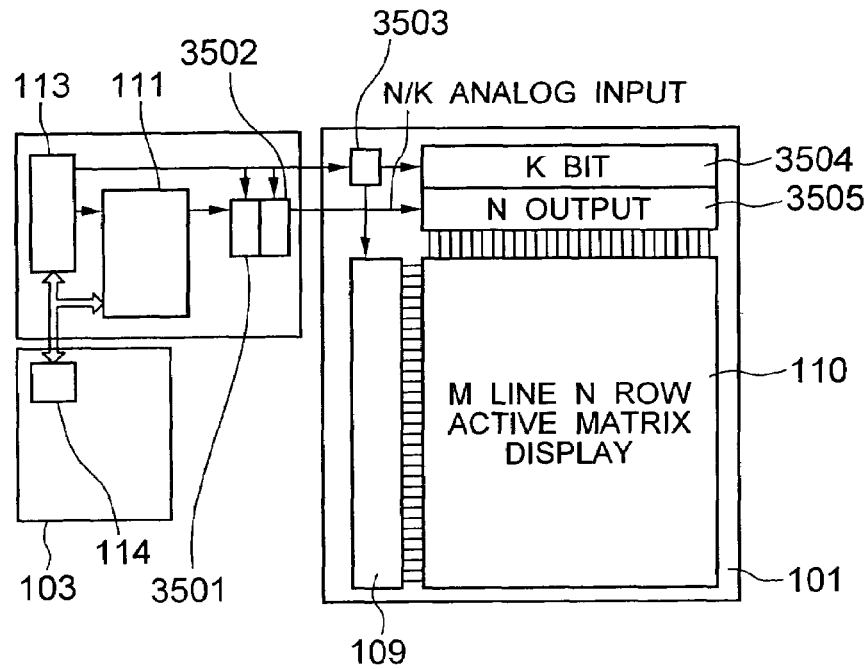
Figure 19B:
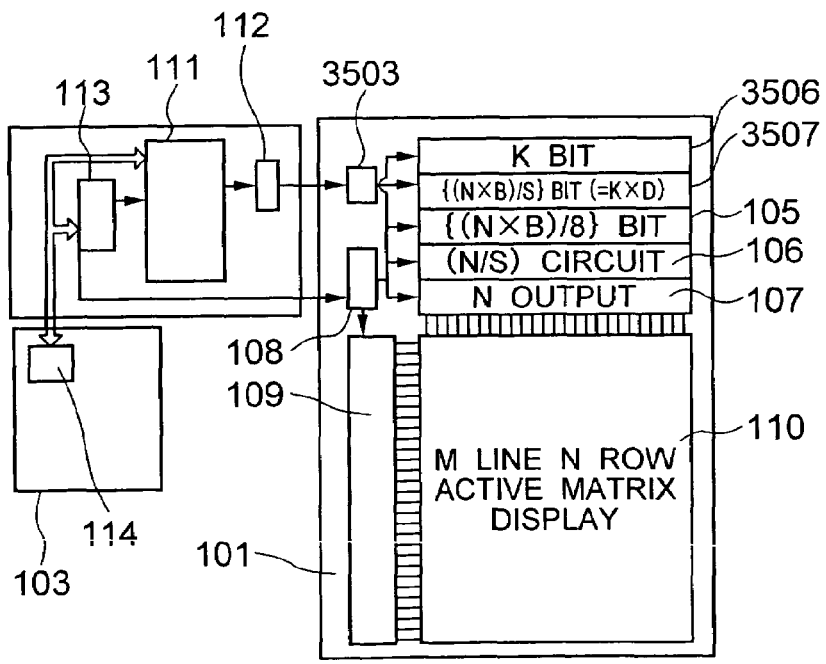
Figure 20A:
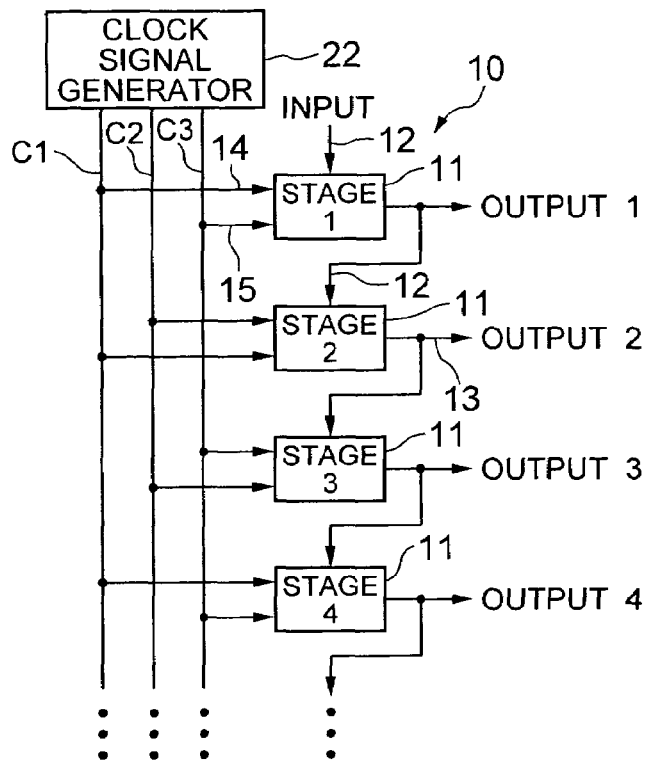
FIGS. 20A and 20B are circuit diagrams showing the configuration of a publicly known example (Patent Document 2)
Figure 20B:
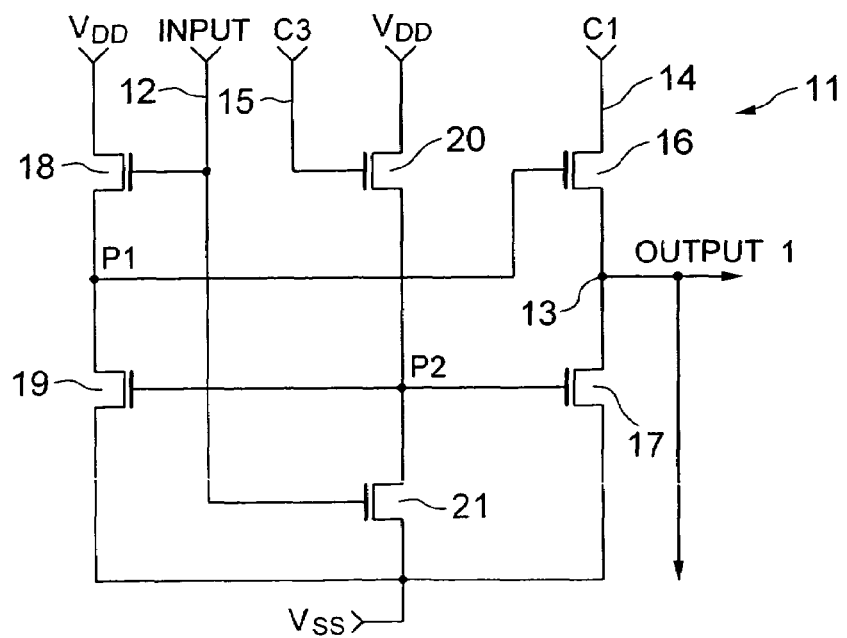
Figure 21A:
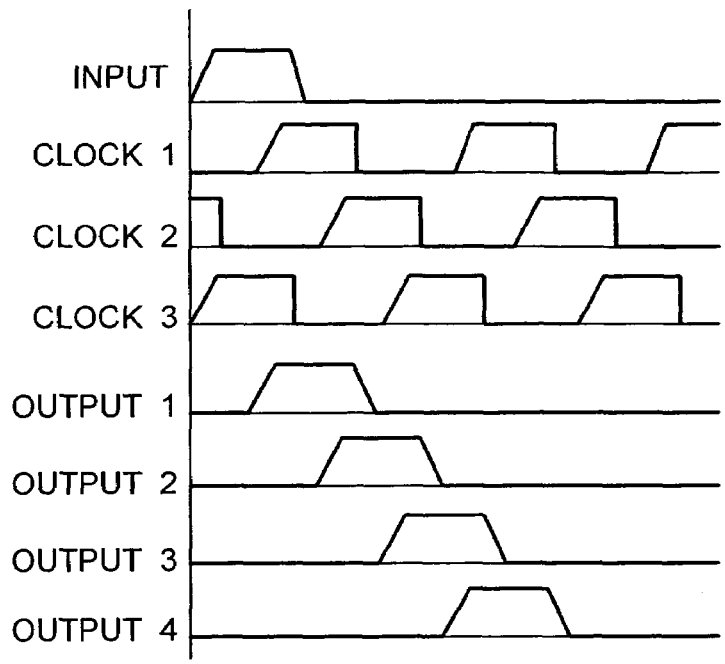
Figure 21B:
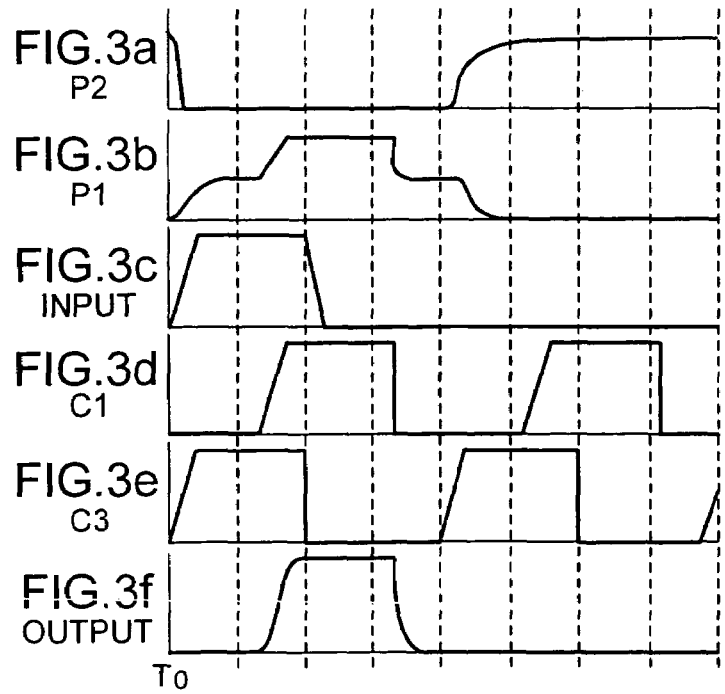
Figure 22A:
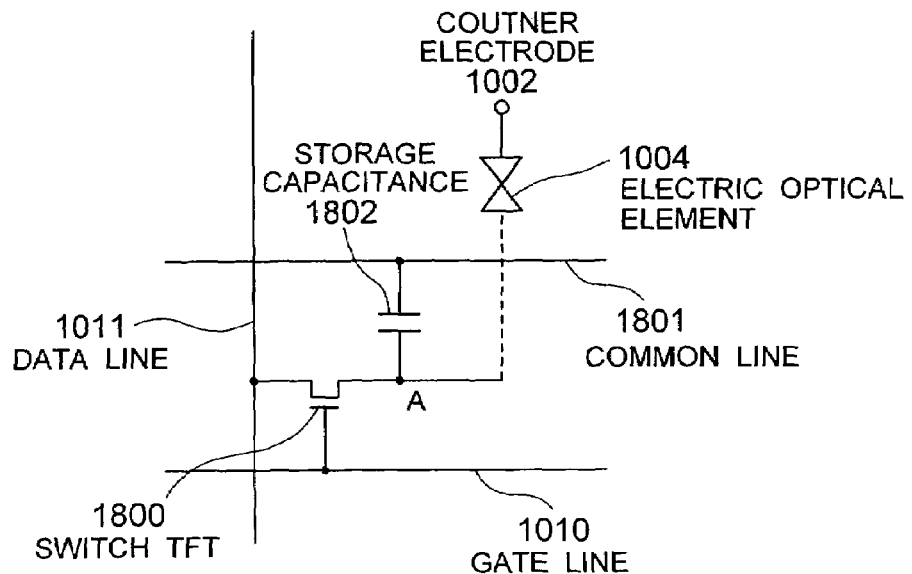
FIG. 22A is a circuit diagram showing the configuration of a pixel in a typical liquid crystal display device.
Figure 22B:
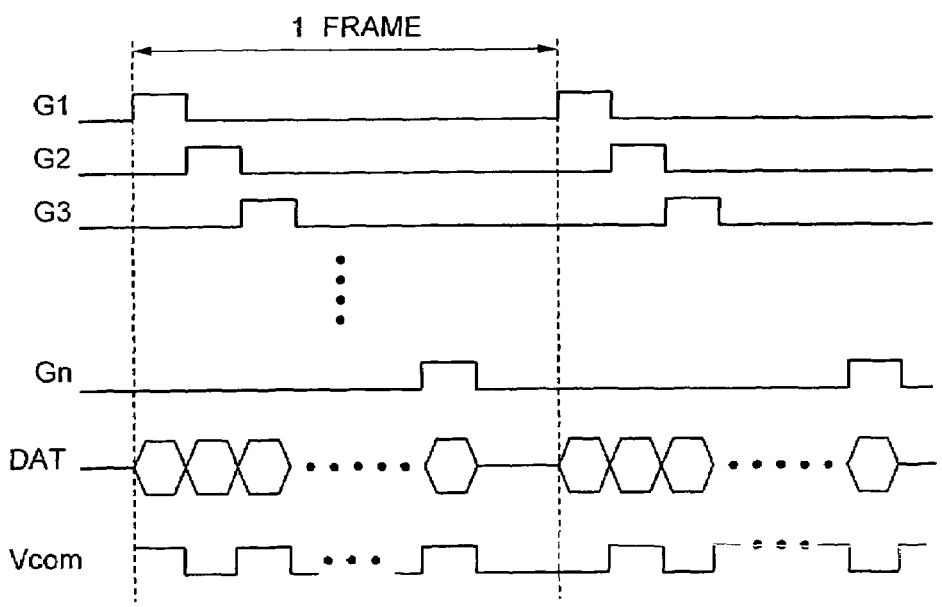
FIG. 22B is a timing chart showing operation of a pixel in a typical liquid crystal display device.
Figure 23A:
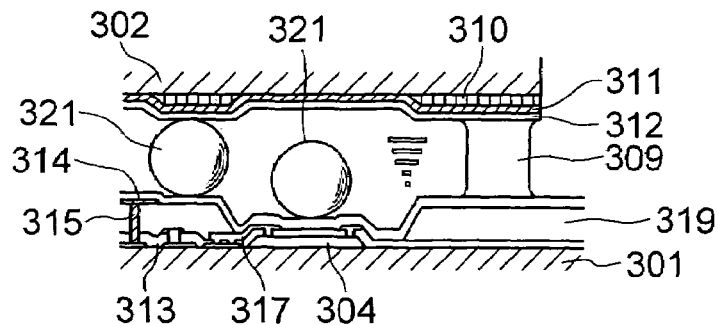
Figure 23B:
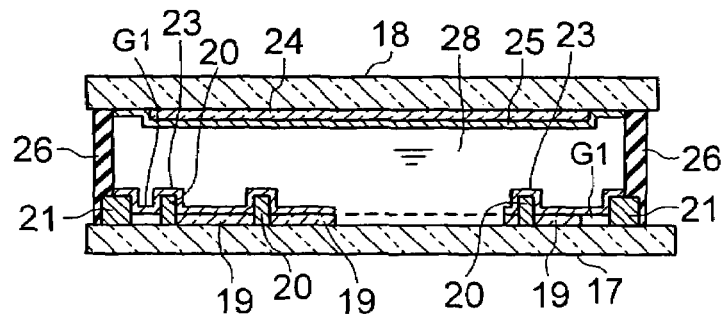
Figure 23C:
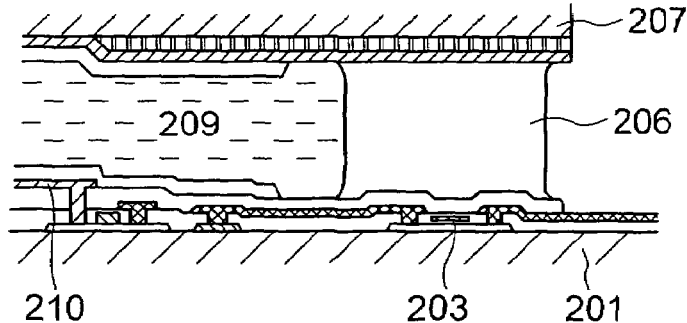
Figure 23D:
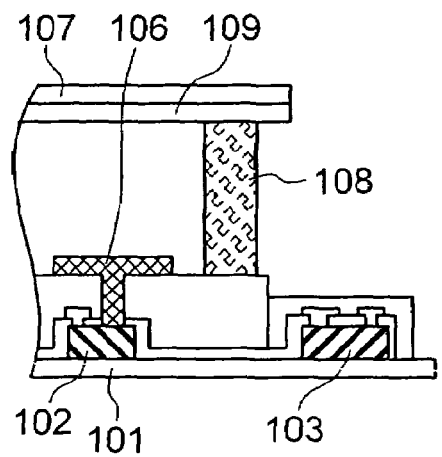
Figure 24A:
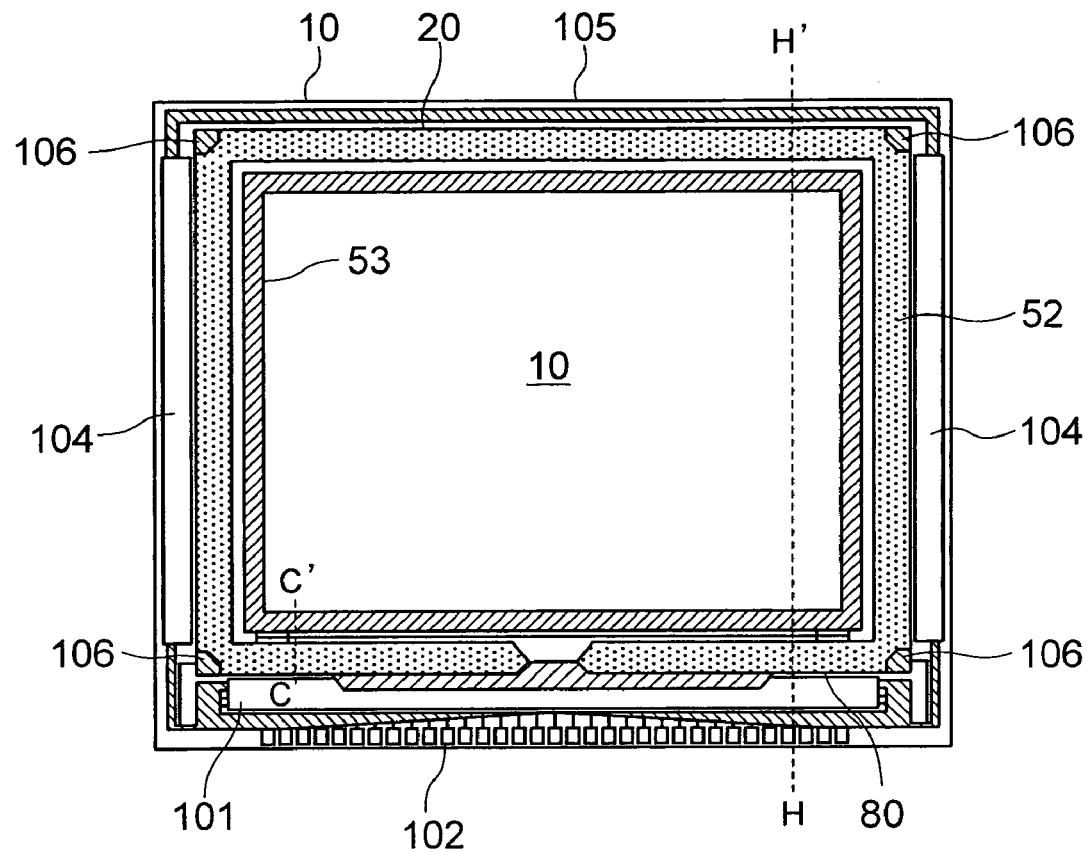
Figure 24B:
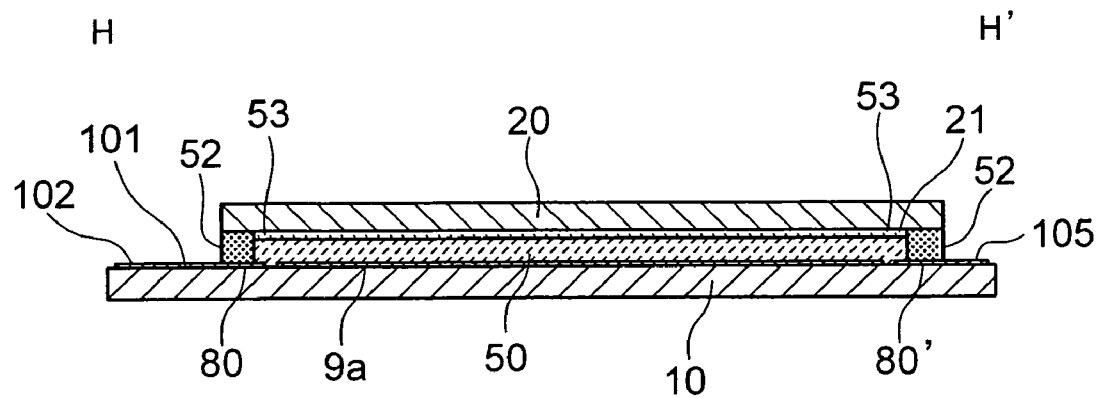
Figure 25:
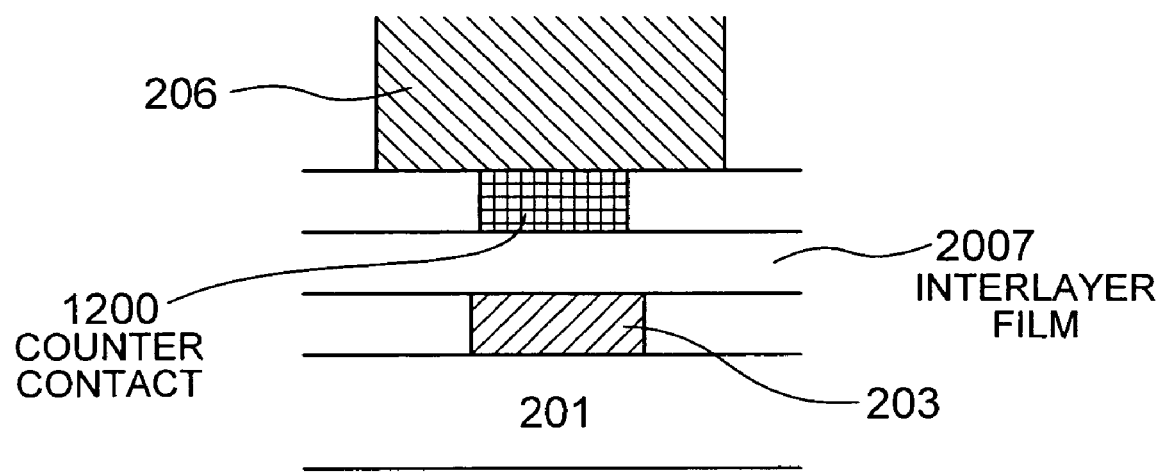
FIG. 25 is an illustration about a problem of the publicly known example of Patent Document 5.
Figure 26A:
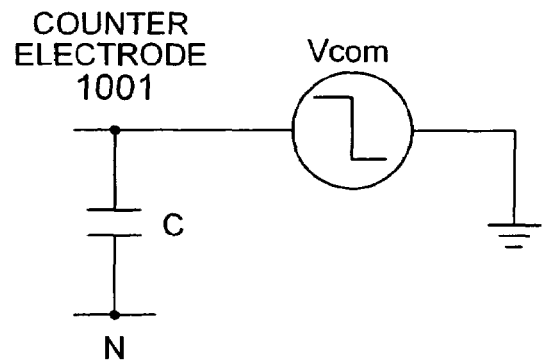
Figure 26B:
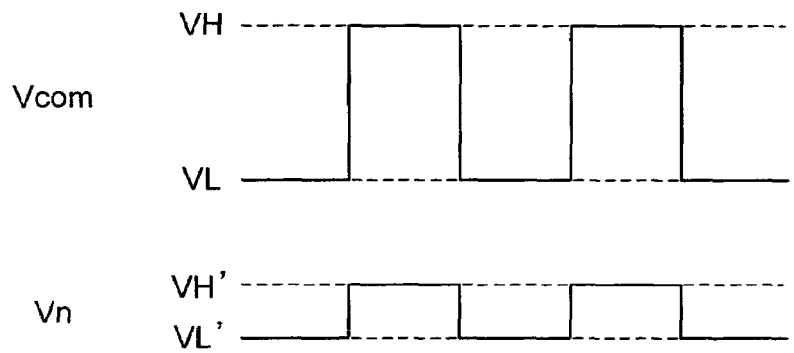
Figure 26C:
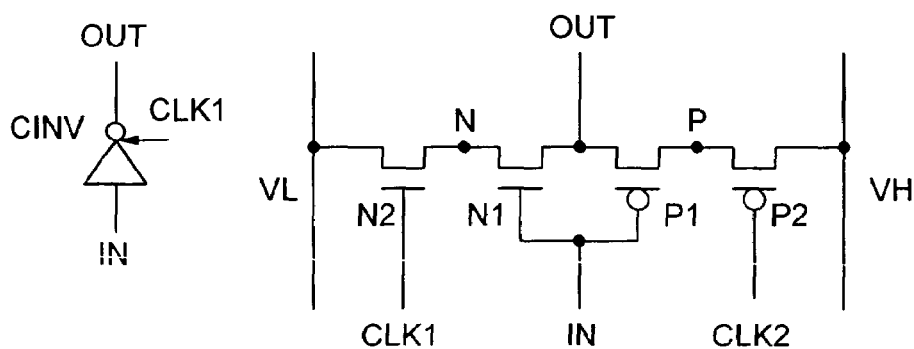

An embodiment 8 shown in FIGS. 18A and 18B is a modification having a configuration that the seals 11a and 11b are arranged in a doubled manner inside and outside of the embodiment 5 shown in FIGS. 15A and 15B.

In the embodiment 8 shown in FIGS. 18A and 18B, the inter-substrate gap control unit 40 shown in FIGS. 16A and 16B is interposed between the seals 11a and 11b doubled manner inside and outside shown in FIGS. 15A and 15B. Therefore, according to the embodiment of the present invention, the effect of the embodiment 5 shown in FIGS. 15A and 15B and the effect of the embodiment 6 shown in FIGS. 16A and 16B are achieved together.

In manufacturing the display device according to the embodiment 8, methods of producing the TFT substrate 10 and the counter substrate 19 are similar to those of the embodiment 1 or 2, respectively. In the embodiment 8, the configuration of the seal and the like is different from that of other embodiments, so a method of producing the seal will be explained below. It is desirable that the inter-substrate gap control unit 40 be formed additionally in the process of producing the TFT substrate 10. After the TFT substrate 10 is produced, resist is applied again and patterned to thereby form the inter-substrate gap control unit 40 at a predetermined position. Then, it is desirable that the second seal 11b and the first seal 11a be disposed at predetermined positions by dispenser for example, respectively. However, screen printing using a printing plate can be accepted. By adhering the TFT substrate 10 and the counter substrate 19 by using the process of producing the first seal 11a and the second seal 11b, the display device of the eighth embodiment is produced.

INDUSTRIAL APPLICABILITY

As described above, in the present invention, circuit elements, in a driver circuit for controlling pixels in a display area, affected by stray capacitance formed between a conductive seal and a driver circuit is disposed with a distance from the conductive seal. Therefore, even if voltage fluctuation of counter electrode is caused, it is possible to prevent the driver circuit from being affected by the stray capacitance, whereby high operational margin and high reliability can be realized. Further, since it has such a configuration that only the positional relationship of the circuit elements with respect to the conductive seal is changed, it is possible to realize an active matrix display device having such a configuration that a driver circuit is integrated with a substrate at low cost.

What is claimed is:

1. A display device comprising:
   a pair of substrates disposed opposite each other; a conductive seal for sealing a gap of an outer peripheral part between the pair of substrates;
   an electric optical element disposed in an area defined by the substrates and the seal;
   a display area, formed on one of the substrates, having a plurality of pixels for controlling the electric optical element; and
   a driver circuit for controlling the pixels, wherein
   the driver circuit includes a node having a period in which the node is in a floating state and a remaining circuit element, and
   wherein a part of the node is disposed at a position apart from the conductive seal.

2. The display device, as claimed in claim 1, wherein the conductive seal includes a non-conductive seal, and the non-conductive seal covers the the part of the node.

3. The display device, as claimed in claim 1, wherein the conductive seal includes an inter-substrate gap regulating unit having non-conductivity, and the inter-substrate gap regulating unit is interposed between the pair of substrates.

4. The display device, as claimed in claim 2, wherein an inter-substrate gap regulating unit having non-conductivity is interposed between the conductive seal and the non-conductive seal, and the inter-substrate gap regulating unit is interposed between the pair of substrates.

5. The display device, as claimed in claim 1, wherein an edge of a counter electrode provided on the substrate is disposed at a position away from the node.

6. The display device, as claimed in claim 1, wherein the node of the driver circuit is a circuit element for causing a bootstrap effect, and the node is disposed away from the conductive seal.

7. The display device, as claimed in claim 1, wherein the node of the driver circuit is a dynamic circuit, and a part of the dynamic circuit is disposed away from the conductive seal.

* * * * *